United States Patent
Kawakami

(10) Patent No.: US 9,819,829 B2
(45) Date of Patent: Nov. 14, 2017

(54) IMAGE PROCESSING APPARATUS AND CONTROL METHOD

(71) Applicant: CANON KABUSHIKI KAISHA, Tokyo (JP)

(72) Inventor: Shuuhei Kawakami, Higashiyamoto (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/097,017

(22) Filed: Apr. 12, 2016

(65) Prior Publication Data

US 2016/0309057 A1    Oct. 20, 2016

(30) Foreign Application Priority Data

Apr. 14, 2015  (JP) ................. 2015-082561

(51) Int. Cl.

| | | |
|---|---|---|
| H04N 1/44 | (2006.01) | |
| H04N 1/34 | (2006.01) | |
| H04N 1/00 | (2006.01) | |
| H04L 29/06 | (2006.01) | |
| G06Q 40/00 | (2012.01) | |

(52) U.S. Cl.
CPC ......... *H04N 1/4413* (2013.01); *G06Q 40/12* (2013.12); *H04L 63/08* (2013.01); *H04L 63/10* (2013.01); *H04N 1/00344* (2013.01); *H04N 1/00464* (2013.01); *H04N 1/346* (2013.01); *H04N 1/348* (2013.01); *H04N 1/4426* (2013.01); *H04N 2201/0094* (2013.01)

(58) Field of Classification Search
CPC .......... H04N 1/4413; H04N 1/00344; H04N 1/00464; H04N 1/346; H04N 1/348; H04N 1/4426; H04N 2201/0094; H04L 63/08; H04L 63/10; G06Q 40/12
USPC ........................................................ 358/1.14
See application file for complete search history.

(56) References Cited

U.S. PATENT DOCUMENTS

| | | | |
|---|---|---|---|
| 2004/0024654 A1* | 2/2004 | Kanada ............ | G11B 20/00086 705/58 |
| 2005/0171830 A1* | 8/2005 | Miller ................ | G06Q 10/1095 705/7.19 |
| 2013/0239185 A1* | 9/2013 | Orttung ................... | G06F 21/40 726/5 |
| 2013/0242337 A1* | 9/2013 | Miyamoto ......... | H04N 1/00838 358/1.14 |

(Continued)

FOREIGN PATENT DOCUMENTS

| | | |
|---|---|---|
| JP | 2013-192165 A | 9/2013 |
| JP | 2014-164592 A | 9/2014 |

*Primary Examiner* — Allen H Nguyen
(74) *Attorney, Agent, or Firm* — Canon U.S.A., Inc. IP Division

(57) ABSTRACT

An expense management application of an MFP requests a matter management server to perform user authentication when a user accesses a web server via a web browser and acquires matter information about the authenticated user. Further, the expense management application monitors a parameter log of a service provider and acquires information about a job, when executed by the service provider according to a request from the web server, from the parameter log. Then, the expense management application registers expense information based on the acquired information, as expense information about the acquired matter information, to the matter management server.

8 Claims, 35 Drawing Sheets

(56) References Cited

U.S. PATENT DOCUMENTS

2015/0242964 A1* 8/2015 Nakayama ............. G06Q 40/12
  705/30

* cited by examiner

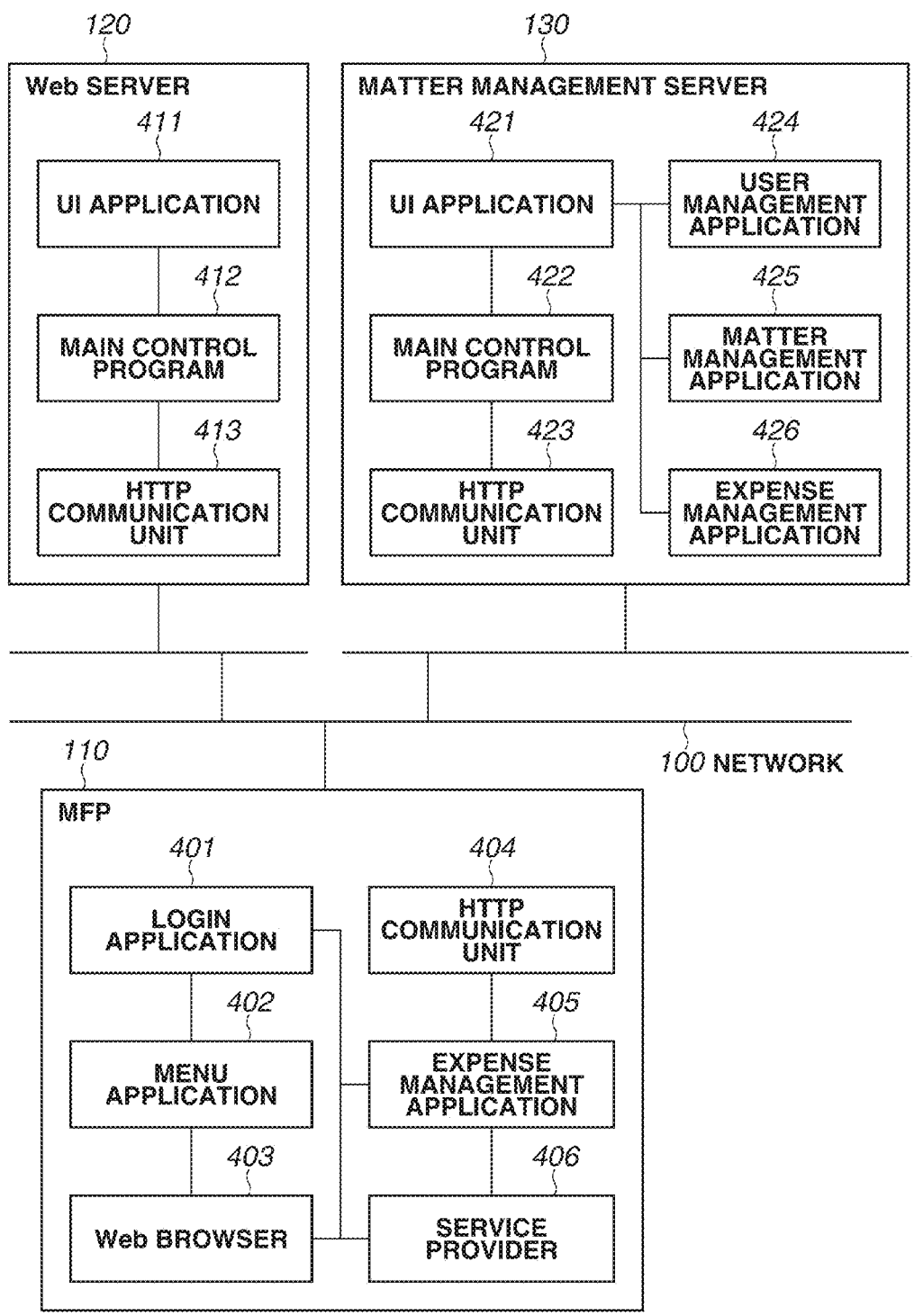

FIG.5A

DEVICE USER INFORMATION 500

| DEVICE USER ID (501) | DEVICE USER PASSWORD (502) | DEVICE USER NAME (503) |
|---|---|---|
| DU0001 | dpass1 | DevUser1 |
| DU0002 | dpass2 | DevUser2 |
| DU0003 | dpass3 | DevUser3 |
| ... | ... | ... |

MATTER MANAGEMENT SERVER AUTHENTICATION INFORMATION 510

| DEVICE USER ID (511) | MATTER MANAGEMENT SERVER ID (512) | MATTER MANAGEMENT SERVER URL (513) | MATTER MANAGEMENT SERVER USER ID (514) | MATTER MANAGEMENT SERVER AUTHENTICATION TOKEN (515) |
|---|---|---|---|---|
| DU0001 | MTS0001 | http://www.mtserverA.xxx.yyy | MU0001 | abiagsui |
| DU0002 | MTS0001 | http://www.mtserverA.xxx.yyy | MU0002 | dc1savwa |
| DU0003 | MTS0001 | http://www.mtserverA.xxx.yyy | MU0003 | fgymv7xc |
| DU1001 | MTS0002 | http://www.mtserverB.xxx.yyy | MU1003 | gyu6epoa |
| ... | ... | ... | ... | ... |

Web APPLICATION INFORMATION 520

| Web APPLICATION ID (521) | Web APPLICATION NAME (522) | Web APPLICATION LOGIN URL (523) | Web APPLICATION LOGOUT URL (524) | MATTER SETTING SCREEN INFORMATION ID (525) |
|---|---|---|---|---|
| WS0001 | PRECEDENT INFORMATION SERVICE | http://www.wserver1.aaa.bbb/login.html | http://www.wserver1.aaa.bbb/logout.html | AS0001 |
| WS0002 | STATISTICAL INFORMATION SERVICE | http://www.wserver2.ccc.ddd/logon.html | http://www.wserver2.ccc.ddd/logout.html | AS1001, AS1002 |
| ... | ... | ... | ... | ... |

FIG.5B

EXPENSE MANAGEMENT LOG 530

| Web APPLICATION ID | CATEGORY | DEVICE USER ID | DETAILS |
|---|---|---|---|
| WS0001 | LOGIN | DU0001 | <time>2014/10/23 16:53:0023</time> |
| WS0001 | MATTER INFORMATION | DU0001 | <matterId>M0001</matterId> |
| WS0001 | JOB | DU0001 | <jobNumber>100</jobNumber> |
| WS0001 | JOB | DU0001 | <jobNumber>101</jobNumber> |
| WS0001 | LOGOUT | DU0001 | <time>2014/10/23 17:08:0012</time> |
| ⋮ | ⋮ | ⋮ | ⋮ |

531, 532, 533, 534

MATTER SETTING SCREEN INFORMATION 540

| MATTER SETTING SCREEN INFORMATION ID | MATTER SETTING SCREEN DISPLAY URL | MERGING DISPLAY |
|---|---|---|
| AS0001 | http://www.wserver1.aaa.bbb/menu.html | Y |
| AS1001 | http://www.wserver2.ccc.ddd/menu.html | N |
| AS1002 | http://www.wserver2.ccc.ddd/print.html | Y |
| ⋮ | ⋮ | ⋮ |

541, 542, 543

BILLING INFORMATION 550

| JOB | COLOR | SIZE | AMOUNT OF MONEY |
|---|---|---|---|
| PRINT | MONOCHROME | A4 | 10 |
| PRINT | MONOCHROME | A3 | 15 |
| PRINT | COLOR | A4 | 20 |
| PRINT | COLOR | A3 | 40 |
| SCAN | MONOCHROME | A4 | 5 |
| SCAN | MONOCHROME | A3 | 10 |
| SCAN | COLOR | A4 | 10 |
| SCAN | COLOR | A3 | 20 |
| ⋮ | ⋮ | ⋮ | ⋮ |

MATTER MANAGEMENT SERVER USER INFORMATION 600

| MATTER MANAGEMENT SERVER USER ID /601 | MATTER MANAGEMENT SERVER PASSWORD /602 | MATTER MANAGEMENT SERVER USER NAME /603 | MATTER MANAGEMENT SERVER AUTHENTICATION TOKEN /604 |
|---|---|---|---|
| MU0001 | mpass1 | MatUser1 | abjagsui |
| MU0002 | mpass2 | MatUser2 | dc1savwa |
| MU0003 | mpass3 | MatUser3 | fgvmv7xc |
| ⋮ | ⋮ | ⋮ | ⋮ |

MATTER INFORMATION 610

| MATTER ID /611 | MATTER NAME /612 | RESPONSIBLE USER ID /613 |
|---|---|---|
| M0001 | LITIGATION A | MU0001 |
| M0002 | INCIDENT B | MU0001 |
| M0003 | CONCILIATION C | MU0001 |
| ⋮ | ⋮ | ⋮ |

EXPENSE INFORMATION 620

| MATTER ID /621 | EXPENSE ID /622 | EXPENSE NAME /623 | AMOUNT OF EXPENSE /624 | UNIT OF EXPENSE /625 |
|---|---|---|---|---|
| M0001 | C0001 | SUPREME COURT, FEBRUARY 8, 1996 (A) NO.437, PRECEDENT PRINT | 100 | PAGE |
| M0001 | C0002 | SUPREME COURT, AUGUST 1, 1996 (A) NO.441, PRECEDENT PRINT | 120 | PAGE |
| M0002 | C0003 | SUPREME COURT, FEBRUARY 8, 1996 (A) NO.437, PRECEDENT PRINT | 1,000 | YEN |
| M0002 | C0004 | SUPREME COURT, AUGUST 1, 1996 (A) NO.441, PRECEDENT PRINT | 2,400 | YEN |
| M0003 | C0005 | PRECEDENT INFORMATION SERVICE | 15 | MINUTE |
| ⋮ | ⋮ | ⋮ | ⋮ | ⋮ |

FIG.7

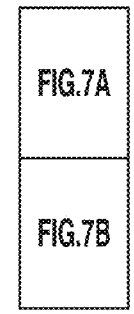

FIG.7A

PARAMETER LOG 700

```
<?xml version="1.0" encoding="UTF-8"?>
<ppsp:MEAP_WebParameterLog
xmlns:ppsp="http://www.mfp01.mmm.nnn/ns/active/MEAP-Web/PullPrintServiceProvider/">
    <ppsp:requestInfo>
        <ppsp:requestingUserName>DU0001</ppsp:requestingUserName> ~701
        <ppsp:jobInstruction>                                              702
            <ppsp:jobInstructionParams>
                <ppsp:jobName>%8d%c5%20%95%bd8%2e2%2e8%81i%82%a0%81j%91%e6437%8d%66%20%94%bb%97%e1%88%f3%8d%fc</ppsp:jobName>
            </ppsp:jobInstructionParams>
        </ppsp:jobInstruction>
    </ppsp:requestInfo>
    <ppsp:resultInfo>
        <ppsp:deviceName>MFP A</ppsp:deviceName>
        <ppsp:documents>
            <ppsp:document>
                <ppsp:fileName>document0001</ppsp:fileName>
                <ppsp:fileId>62fa5eac-3df4-44Bd-a575-916dd5b432f2_0001</ppsp:fileId>
            </ppsp:document>
        </ppsp:documents>
        <ppsp:pageCount>
            <ppsp:totalPageCount>100</ppsp:totalPageCount> ~703
            <ppsp:colorPageCount> ~704
                <ppsp:isoA3>0</ppsp:isoA3> ~705
                <ppsp:isoA4>0</ppsp:isoA4> ~706
            </ppsp:colorPageCount>
            <ppsp:monoPageCount> ~707
                <ppsp:isoA3>0</ppsp:isoA3> ~708
                <ppsp:isoA4>100</ppsp:isoA4> ~709
            </ppsp:monoPageCount>
        </ppsp:pageCount>
        <ppsp:printResults>
            <ppsp:printResult>
                <ppsp:requestFrom>http://www.wserver1.aaa.bbb/</ppsp:destination> ~710
                <ppsp:jobNumber>100</ppsp:jobNumber> ~711
                <ppsp:result>Success</ppsp:result> ~712
            </ppsp:printResult>
        </ppsp:printResults>
    </ppsp:resultInfo>
</ppsp:MEAP_WebParameterLog>
```

FIG.7B

```
<ppsp:MEAP_WebParameterLog
    xmlns:ppsp="http://www.mfp01.mmm.nnn/ns/active/MEAP-Web/PullPrintServiceProvider/">
    <ppsp:requestInfo>
        <ppsp:requestingUserName>DU0001</ppsp:requestingUserName> ~713
        <ppsp:jobInstruction>                                                        714
            <ppsp:jobInstructionParams>
                <ppsp:jobName>%9d%c5%20%95%bd8%2e8%2e1%81j%82%a0%81j%91%e6441%9d%66%20%94%bb%97%e1%88%f3%9d%fc</ppsp:jobName>
            </ppsp:jobInstructionParams>
        </ppsp:jobInstruction>
    </ppsp:requestInfo>
    <ppsp:resultInfo>
        <ppsp:deviceName>MFP A</ppsp:deviceName>
        <ppsp:documents>
            <ppsp:document>
                <ppsp:fileName>document0002</ppsp:fileName>
                <ppsp:fileId>62fa5eac-3df4-44Bd-a575-916dd5b432f2_0002</ppsp:fileId>
            </ppsp:document>
        </ppsp:documents>
        <ppsp:pageCount>
            <ppsp:totalPageCount>120</ppsp:totalPageCount> ~715
            <ppsp:colorPageCount> ~716
                <ppsp:isoA3>0</ppsp:isoA3> ~717
                <ppsp:isoA4>0</ppsp:isoA4> ~718
            </ppsp:colorPageCount>
            <ppsp:monoPageCount> ~719
                <ppsp:isoA3>0</ppsp:isoA3> ~720
                <ppsp:isoA4>100</ppsp:isoA4> ~721
            </ppsp:monoPageCount>
        </ppsp:pageCount>
        <ppsp:printResults>
            <ppsp:printResult>
                <ppsp:requestFrom>http://www.wserver1.aaa.bbb/</ppsp:destination> ~722
                <ppsp:jobNumber>100</ppsp:jobNumber> ~723
                <ppsp:result>Success</ppsp:result> ~724
            </ppsp:printResult>
        </ppsp:printResults>
    </ppsp:resultInfo>
</ppsp:MEAP_WebParameterLog>
```

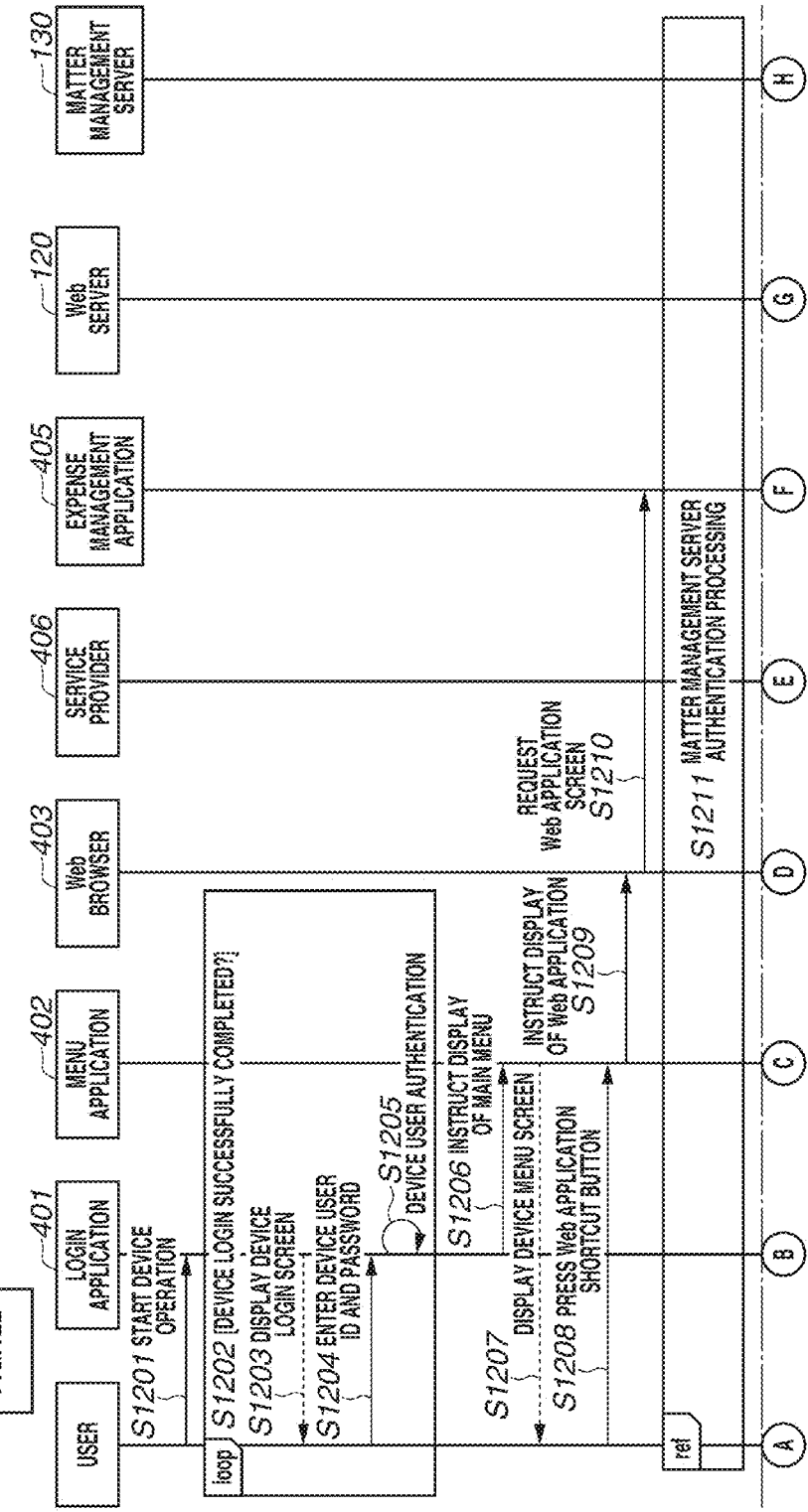

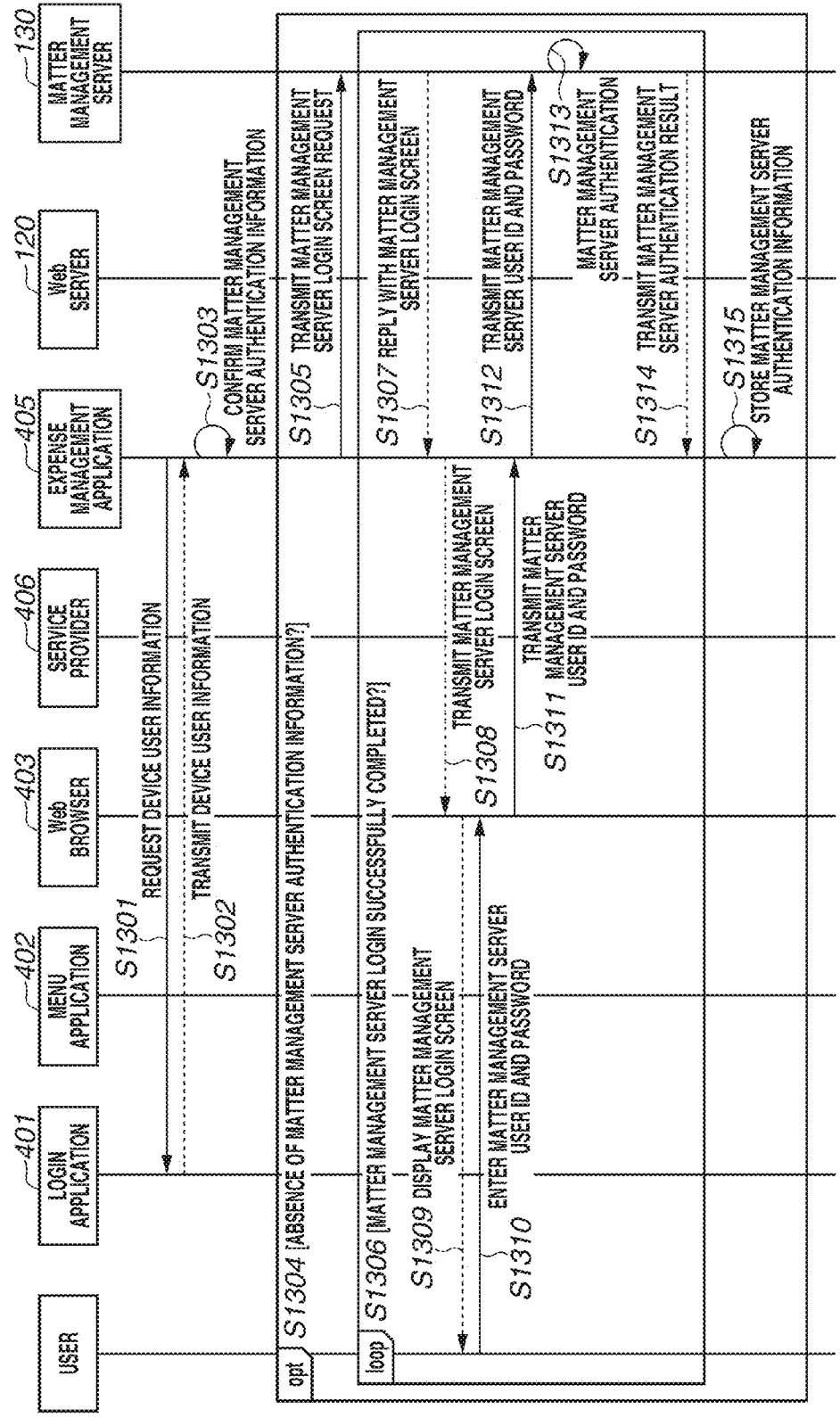

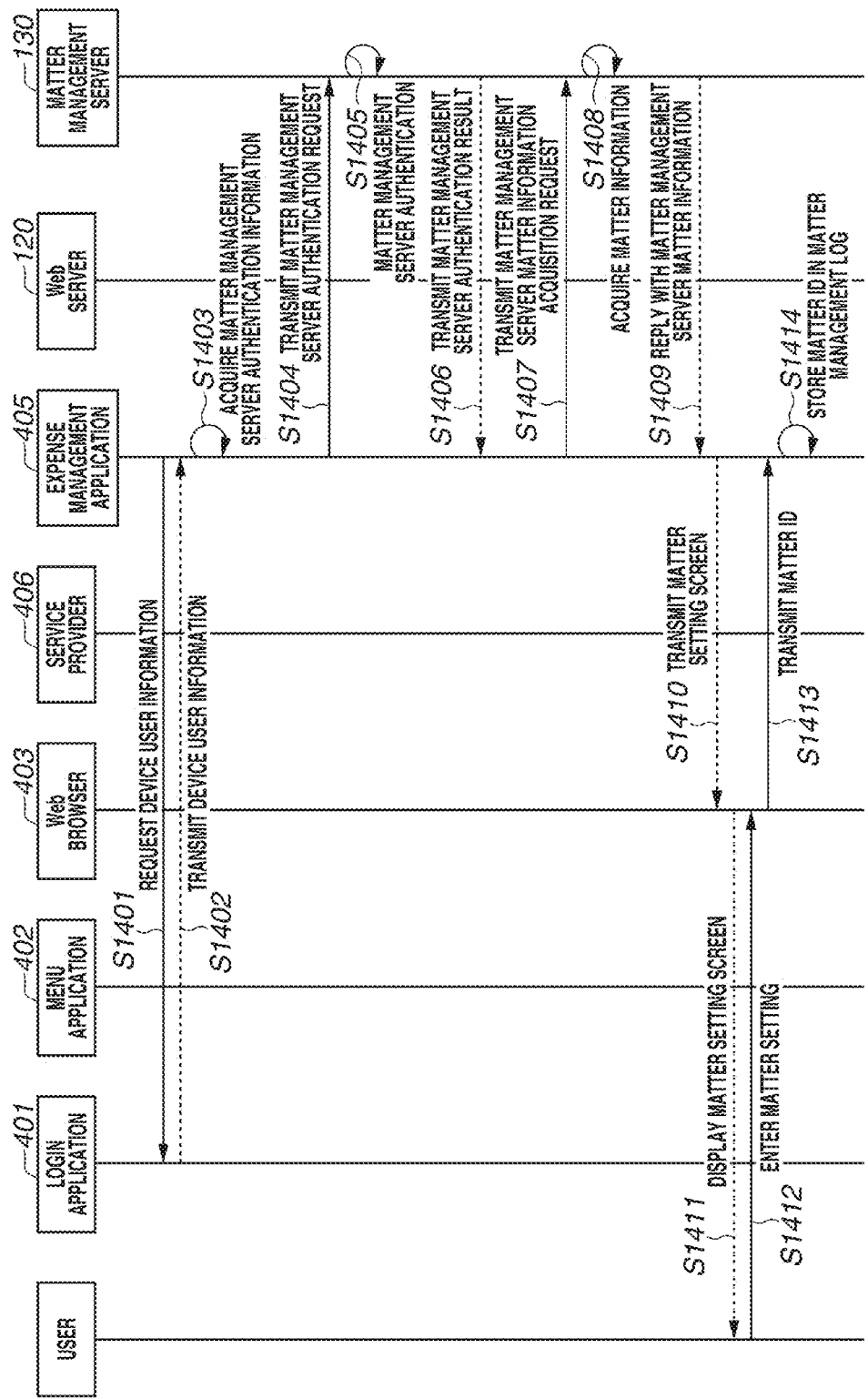

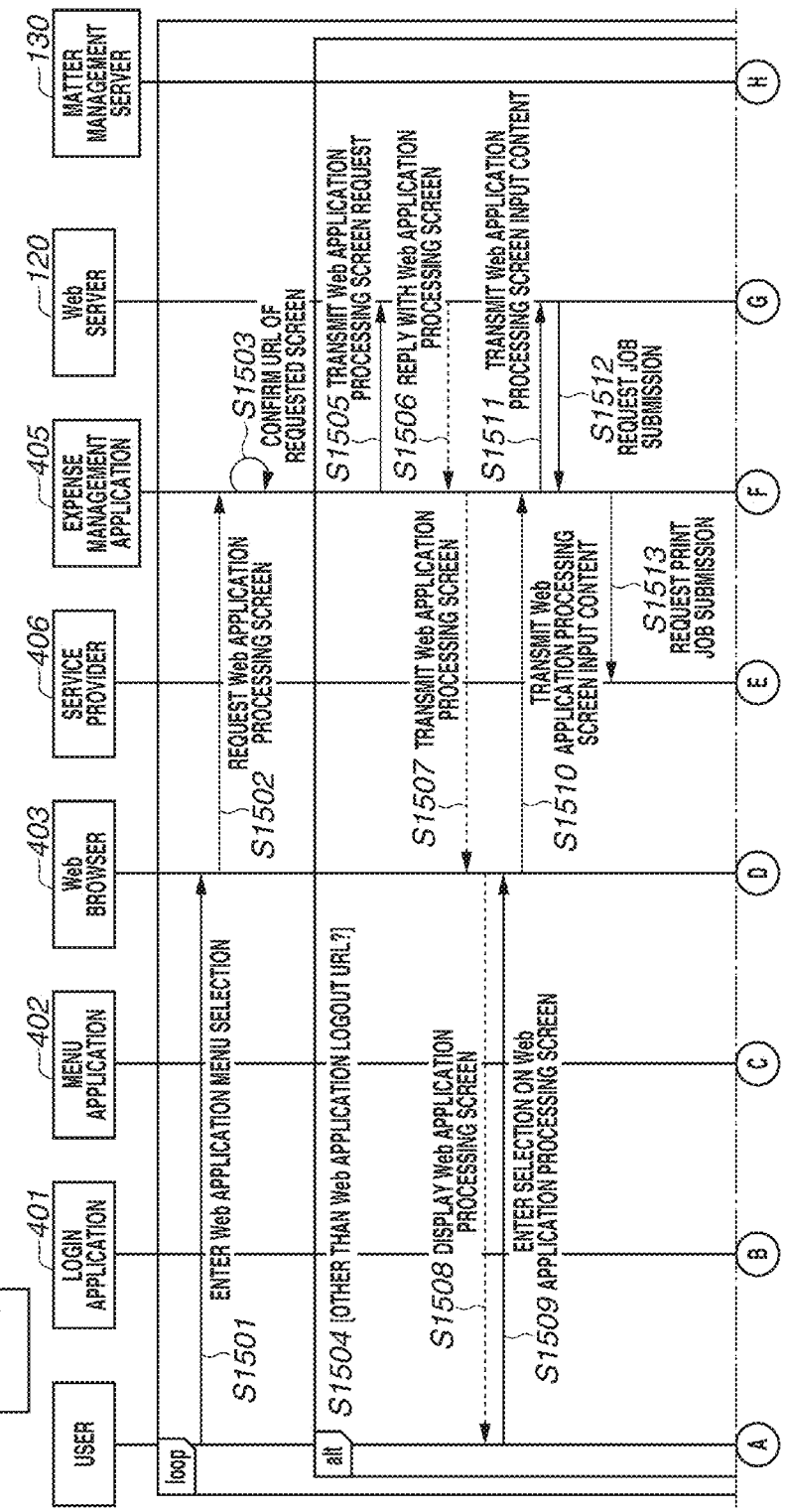

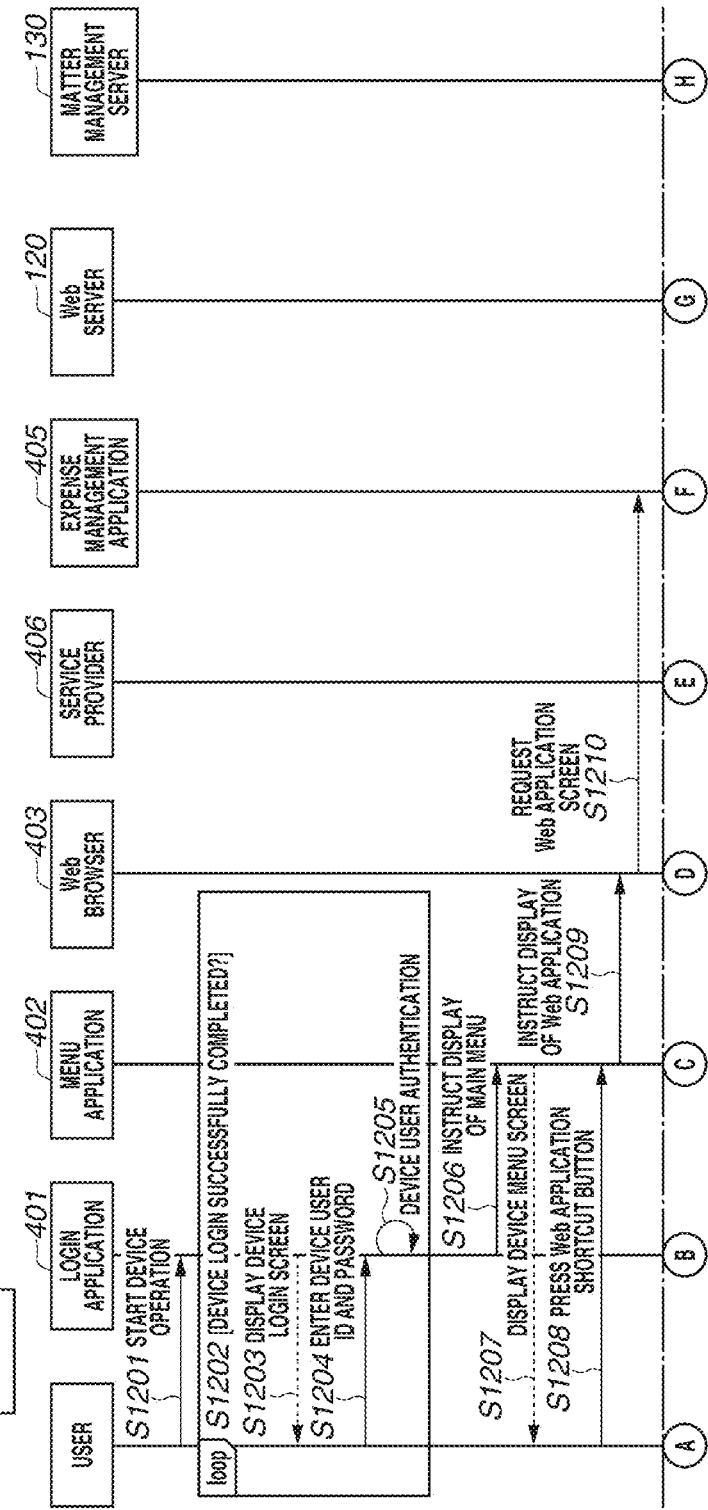

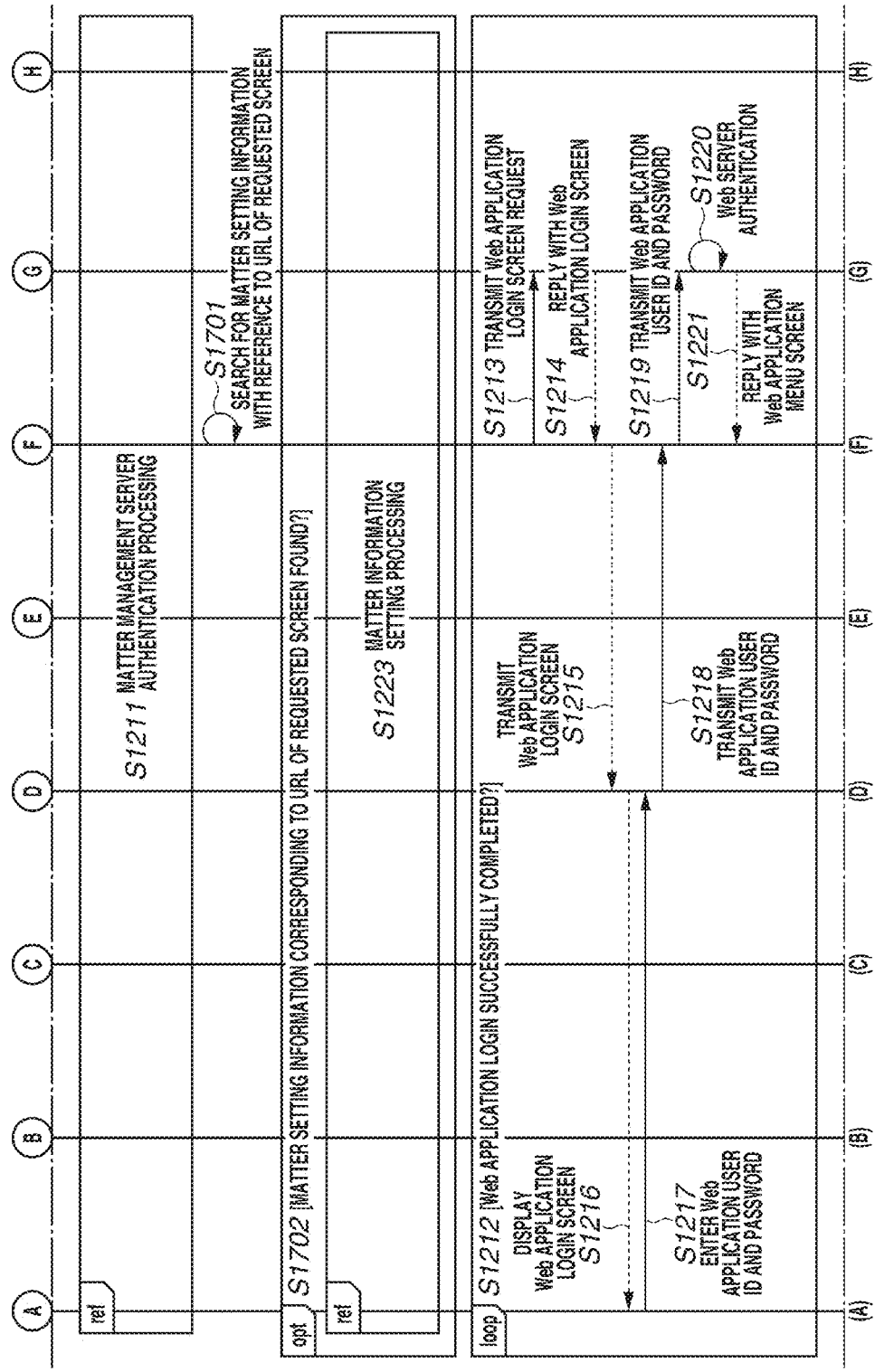

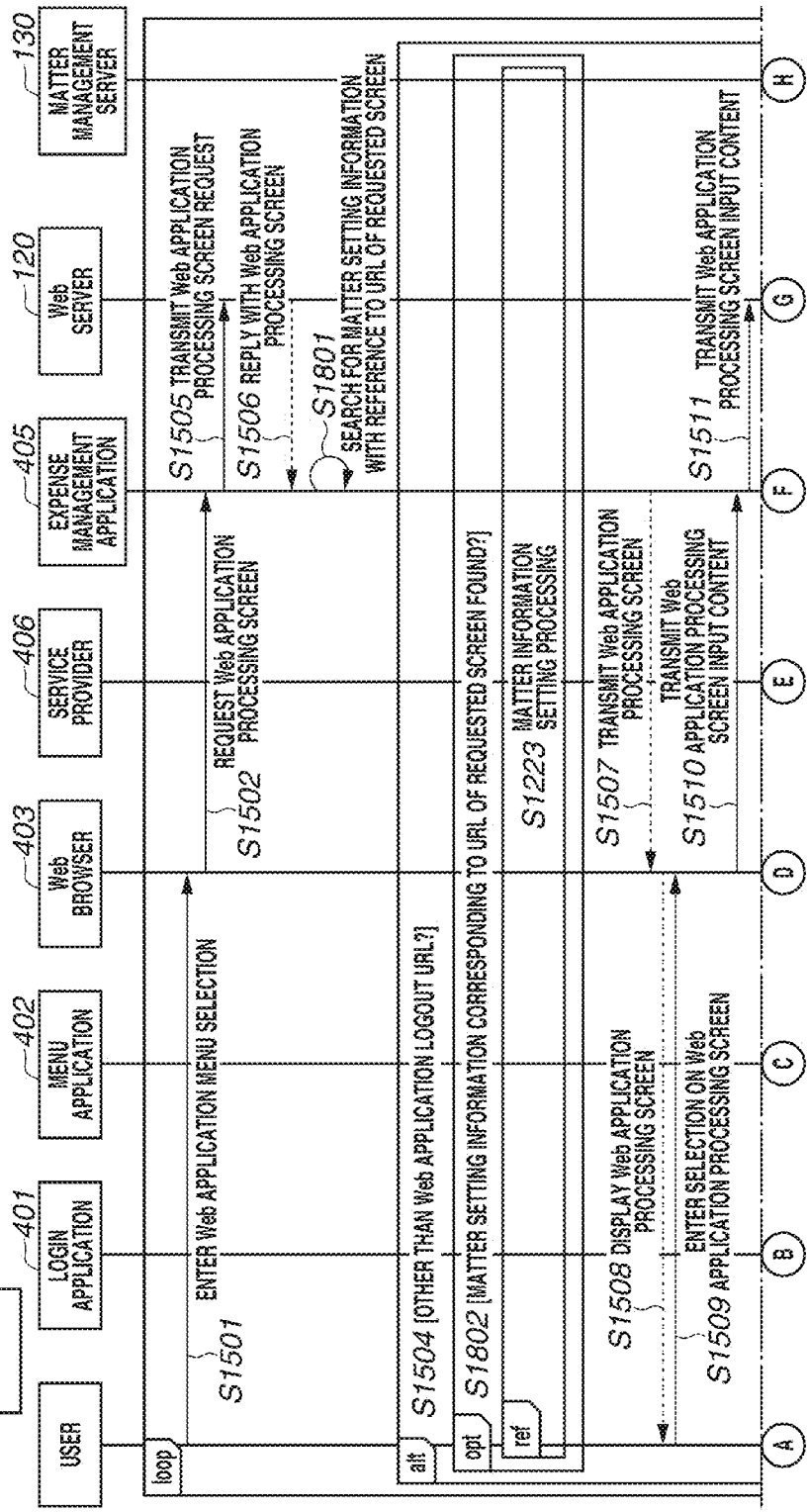

```
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
    <title>PRECEDENT INFORMATION SYSTEM LOGIN</title>
</head>
<body>
    <form method="post" action="login.html"> ~1901
        <p>PLEASE ENTER USER ID AND PASSWORD TO LOG IN PRECEDENT INFORMATION SYSTEM.</p>
        <div class="c1">
            <p>USER ID<input name="username" type="text"/></p> ~1902
            <p>PASSWORD<input name="password" type="text"/></p> ~1903
        </div>
        <input type="submit" value="OK"/> ~1904
    </form>
</body>
</html>
```

1910

```
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
    <title>PRECEDENT INFORMATION SYSTEM LOGIN</title>
</head>
<body>
    <form method="post" action="login.html"> ~1901
        <p>PLEASE ENTER USER ID AND PASSWORD TO LOG IN PRECEDENT INFORMATION SYSTEM.</p>
        <div class="c1">
            <p>USER ID<input name="username" type="text"/></p> ~1902
            <p>PASSWORD<input name="password" type="text"/></p> ~1903
        </div>
        <div class="c1"><font size="-1"> ~1911
            <p>PLEASE SELECT MATTER.</p>
            <select name="MatterID"> ~1912
                <option value="M0001">LITIGATION A</option> ~1913
                <option value="M0002">INCIDENT B</option> ~1914
                <option value="M0003">CONCILIATION C</option> ~1915
            </select>
        </font></div>
        <input type="submit" value="OK"/> ~1904
    </form>
</body>
</html>
```

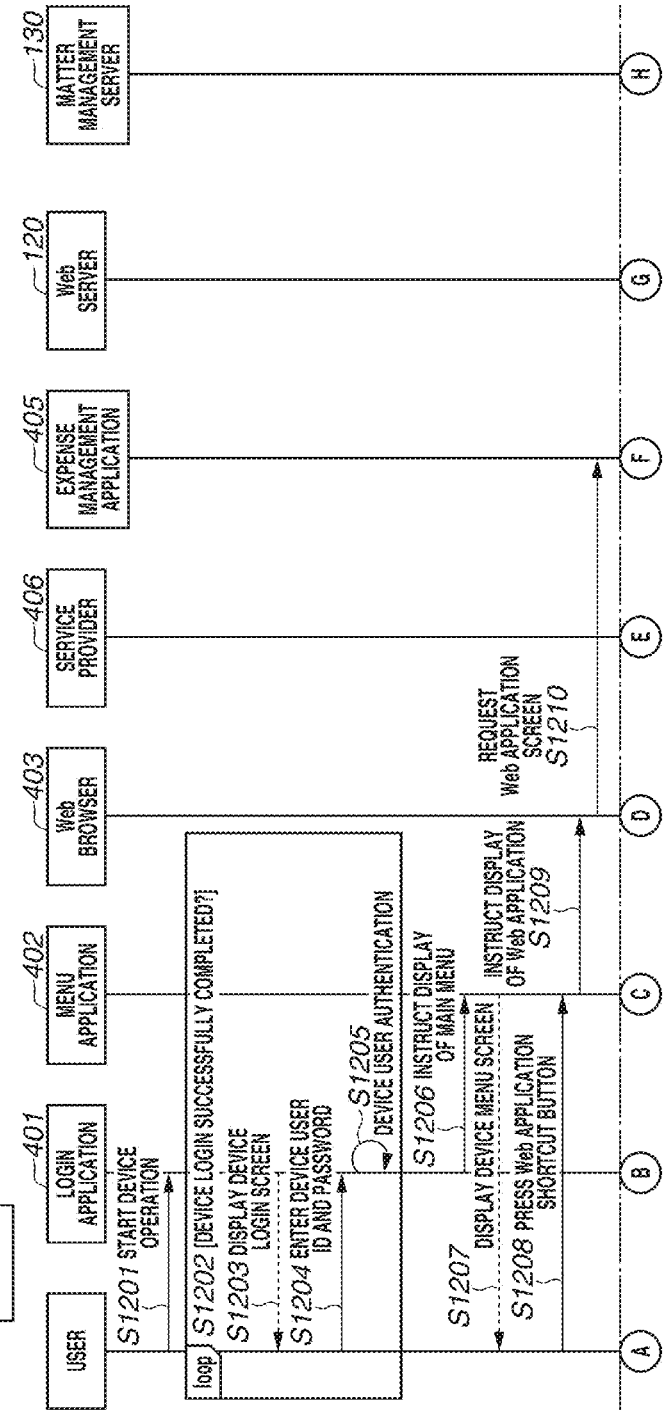

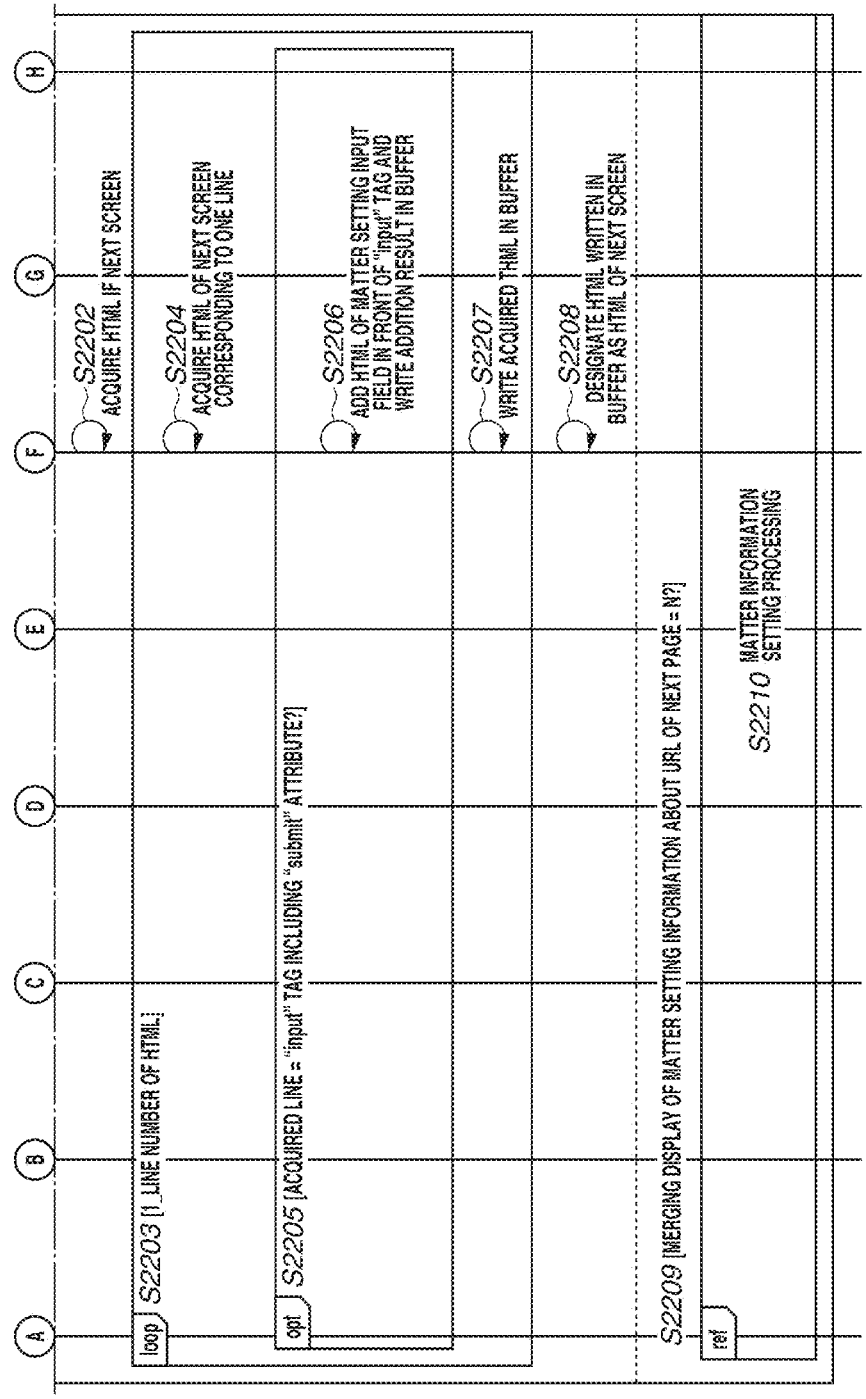

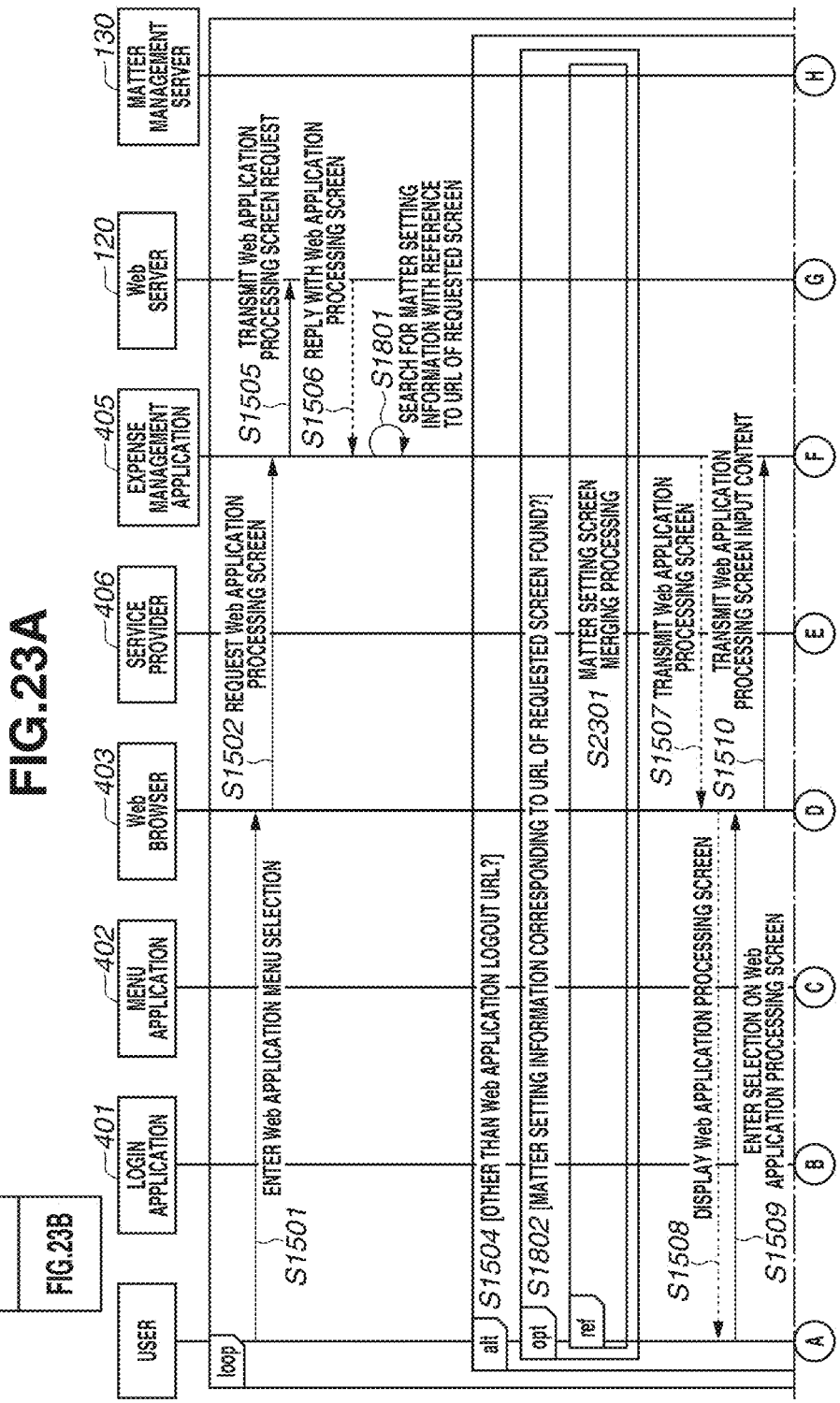

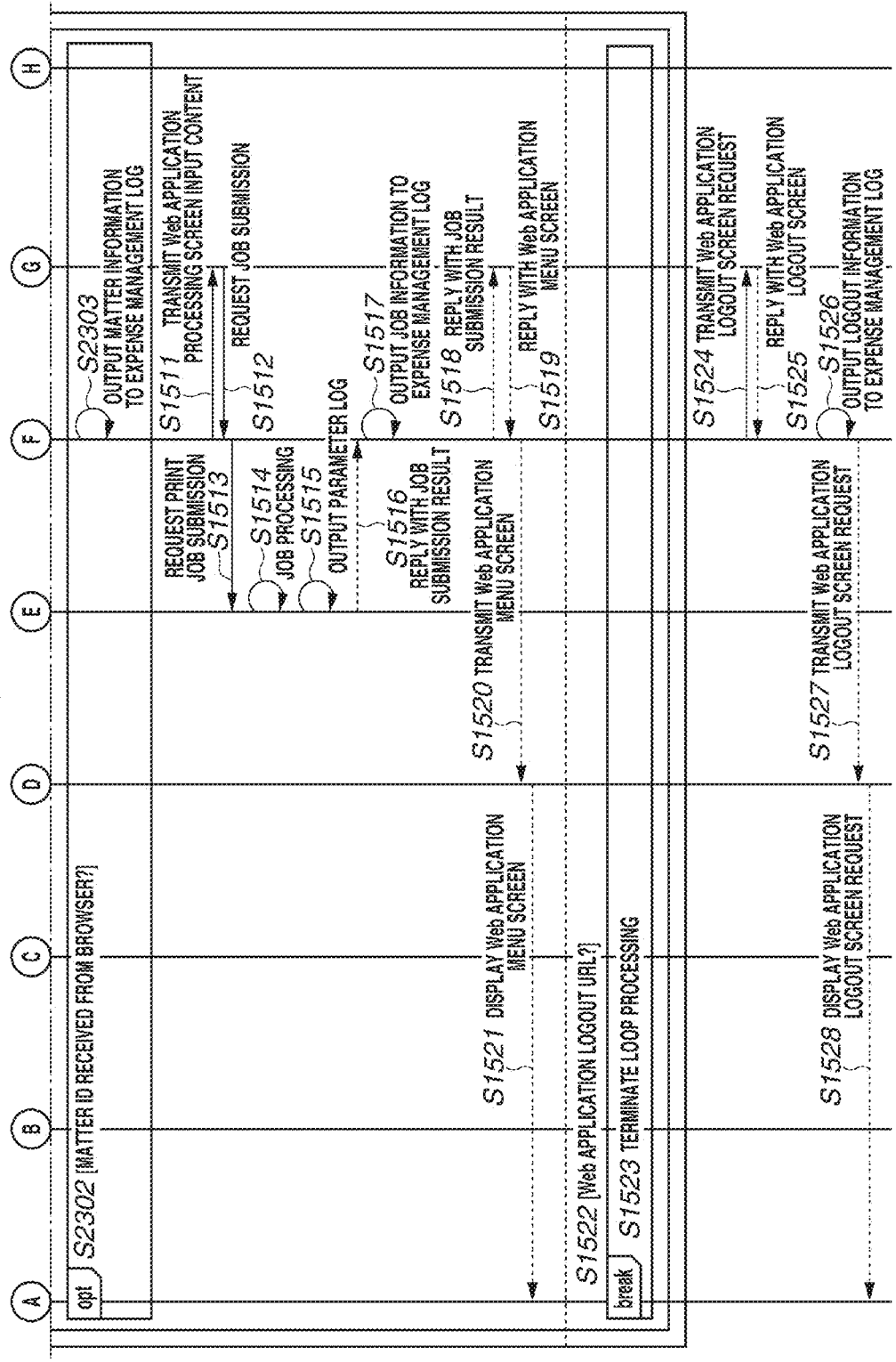

IMAGE PROCESSING APPARATUS AND CONTROL METHOD

BACKGROUND OF THE INVENTION

Field of the Invention

The present invention relates to a system capable of controlling registration of expense information based on a user operation on an image processing apparatus.

Description of the Related Art

It is common that a digital multi-function peripheral (MFP), which is equipped with hardware resources such as a scanner and a printer, is placed in an office for daily use because recent office works often require copy, print, and FAX transmission processing.

However, in a case where such an MFP is located in an office, a client may be asked to pay for the expenses required to use the MFP. The expenses in this case include print related expenses, time-charge rate based expenses, and labor costs of respective workers or persons.

For example, a law firm may ask a client to pay for the expenses required when a lawyer uses an MFP to handle a legal matter. For example, as discussed in Japanese Patent Application Laid-Open No. 2013-192165, there is a conventional image forming apparatus that is configured to ask a client of each matter to pay for the expenses required when the MFP is used as mentioned above. According to the above-mentioned image forming apparatus, a lawyer in charge is required to input matter information that associates the above-mentioned expenses with each matter to the MFP, and a user is required to operate the MFP to perform a copy operation and then, by instructing a job, to register required expense information in association with the input matter information to a matter management server.

On the other hand, it is a trend that an MFP equipped with a scanner and a printer includes a web browser. In this case, the MFP can use the web browser to access a web server and can use a service provided by the web server, as described in detail below. First, the MFP causes the web browser to display an operation screen provided by the web server and receives various instructions from a user. Further, in the MFP, a web application can operate and control an application that uses the scanner and the printer incorporated in a conventional MFP, according to a request from the web server that has accepted various instructions received from a user via the web browser.

Further, as discussed in Japanese Patent Application Laid-Open No. 2014-164592, there is a conventional printing system including a print service server that transmits a print job to an image processing apparatus via a network. In this conventional printing system, the print service server manages print job ID included in each print job to be transmitted in association with user ID. Further, the image processing apparatus transmits the job ID of the executed print job and print job information (e.g., number of printed papers) to a totaling server. Further, the totaling server acquires a corresponding user ID by inquiring the print service server with reference to the job ID received together with the print job information (e.g., number of printed papers), and stores the acquired user ID in association with the print job information (e.g., number of printed papers).

In the above-mentioned system including the web server and the MFP, the following problems arise if sequential web application processing including the processing by the web server and the job execution by the MFP is performed and expense information relating to the sequential processing is registered to an expense management server.

According to the technique discussed in Japanese Patent Application Laid-Open No. 2013-192165, the MFP is simply configured to register information about a job directly performed by the MFP to an expense management apparatus (i.e., the matter management server) and is not configured to execute a job in cooperation with the web browser or the web server. Therefore, it is difficult to display a screen provided from the web server on the web browser and enable a user to select an expense registration matter on the web browser. Further, it was difficult to acquire expense information including operation time or number of times when the web browser logs in or logs out of the web server. Accordingly, the following procedure was required when the MFP cooperates with the web browser or the web server.

More specifically, a user is required to refer to a processing history of the MFP to acquire job information relating to a matter after the user has used the web browser and the web server to perform sequential web application processing. Further, the user is required to calculate a difference between a login time and a logout time while the web browser of the MFP accesses the web server. Then, the user is required to perform a manual operation to register the acquired job information and the above-mentioned calculated time, as expense information, to the matter management server, via a computer. Therefore, a person in charge was always forced to perform a very troublesome work to register the expense information.

Further, according to the technique discussed in Japanese Patent Application Laid-Open No. 2014-164592, the print service server and the totaling server are required to cooperate with each other. Therefore, in a case where the technique discussed in Japanese Patent Application Laid-Open No. 2014-164592 is used to register expense information and matter information about a job executed by the image processing apparatus in response to a request from the web server instructed via the web browser of the image processing apparatus, while associating them with each other, to the matter management server, it is necessary to provide an expense registration processing mechanism dedicated to a cooperation interface of each individual cooperation destination for the web server and the matter management server.

Accordingly, if the configurations of the web server and the matter management server cannot be easily changed, it may be difficult to provide a processing mechanism dedicated to each individual cooperation destination.

SUMMARY OF THE INVENTION

The present invention is directed to a system capable of simply registering expense information to a matter management apparatus when a user uses an image processing apparatus that can cooperate with a service to perform sequential processing, without incorporating a new mechanism into the service or the matter management apparatus.

According to an aspect of the present invention, an image processing apparatus includes an output unit configured to output a first log representing information about a job executed according to a request of a service for providing a function in cooperation with the image processing apparatus, a request unit configured to request an expense management apparatus to perform user authentication processing in a case where a user accesses the service, an acquisition unit configured to acquire matter information of the user authenticated by the expense management apparatus, a monitoring unit configured to monitor the first log output by the output unit and acquire information about a job executed by the image processing apparatus according to the request from the service, from the first log, and a registration unit configured to register expense information based on the information acquired by the monitoring unit, as expense information of the matter information acquired by the acquisition unit, to the expense management apparatus.

Further features of the present invention will become apparent from the following description of exemplary embodiments with reference to the attached drawings.

BRIEF DESCRIPTION OF THE DRAWINGS

FIG. 4 is a block diagram illustrating a software configuration of an expense management system.

FIGS. 5A and 5B are examples of tables illustrating data configurations managed by the MFP.

FIG. 6 is an example of a table illustrating a data configuration managed by the matter management server.

FIG. 7 (consisting of FIGS. 7A and 7B) is a diagram illustrating an example of a parameter log output by a service provider of the MFP.

FIG. 13 is a sequence diagram illustrating matter management server authentication processing.

FIG. 14 is a sequence diagram illustrating matter information setting.

FIG. 19 illustrates examples of HTML of the web application screen.

FIG. 23 (consisting of FIGS. 23A and 23B) is a sequence diagram illustrating web application execution processing according to the third exemplary embodiment.

DESCRIPTION OF THE EMBODIMENTS

Exemplary embodiments of the present invention will be described in detail below with reference to attached drawings.

In an exemplary embodiment, an MFP (i.e., an example of an image processing apparatus according to the present invention) performs processing for displaying a matter setting screen on a web browser, and after a job has been executed according to an instruction from a web server, performs processing for registering expense with job information to a matter management server based on matter information entered by a user, as described below.

<System Configuration>

Figure 1:
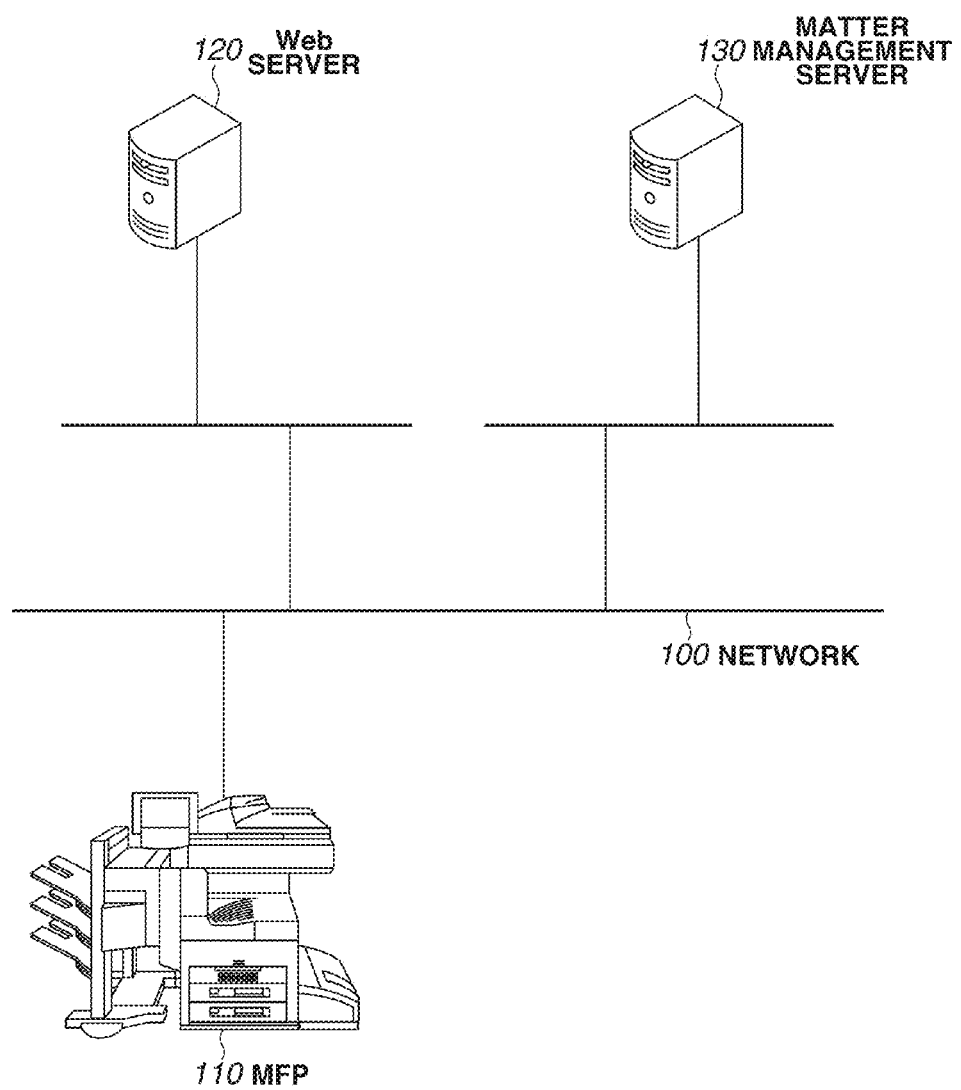
FIG. 1 illustrates a configuration of an expense information management system according to an exemplary embodiment.

FIG. 1 is a diagram illustrating an example configuration of an expense information management system according to a first exemplary embodiment of the present invention.

The expense information management system according to the present exemplary embodiment includes a digital multi-functional machine 110 (i.e., an example of the image processing apparatus), a web server 120, and a matter management server 130. Hereinbelow, the digital multi-functional machine 110 is referred to as a multi function peripheral (MFP). In the present exemplary embodiment, the MFP is one of representative machines that can operate as the image processing apparatus. The image processing apparatus according to the present exemplary embodiment can be a mono-functional image forming apparatus, such as a printer, a scanner, or a facsimile. Further, the present invention can be applied to various office devices and other information processing apparatuses, which are connected to a network.

The MFP 110 is an apparatus having a copy function, a print function, and a FAX function. Detailed configuration of the MFP 110 will be described below.

The web server 120 is a server that can execute web applications that the MFP 110 can use via a web browser 403 (see FIG. 4). For example, the web server 120 can provide various services, including print and OCR services, to the MFP 110. More specifically, the MFP 110 accesses the web server 120 via the web browser 403 to use the services provided by the web server 120.

The matter management server 130 is an expense management apparatus that can manage business expense for each matter, which is for example required for each matter of a client handled as a work in a law firm. In the present exemplary embodiment, the matter management server 130 manages business expenses occurring through sequential web application processing by the web browser 403 of the MFP 110 and the web server 120.

The MFP 110, the web server 120, and the matter management server 130 illustrated in FIG. 1 are mutually connected via a network 100 (e.g., Ethernet (registered trademark)) to communicate with each other. For example, the web server 120 and the matter management server 130 are connected to the internet, while the MFP 110 is connected to a local area network. The web server 120 and the matter management server 130 can be realized by the same apparatus. Further, the expense information management system according to the present exemplary embodiment is not limited to the illustrated configuration in the number of constituent devices.

<Hardware Configuration>

A hardware configuration of each apparatus that constitutes the expense information management system according to the present exemplary embodiment will be described in detail below with reference to FIGS. 2 and 3.

<Hardware Configuration of MFP 110>

Figure 2:
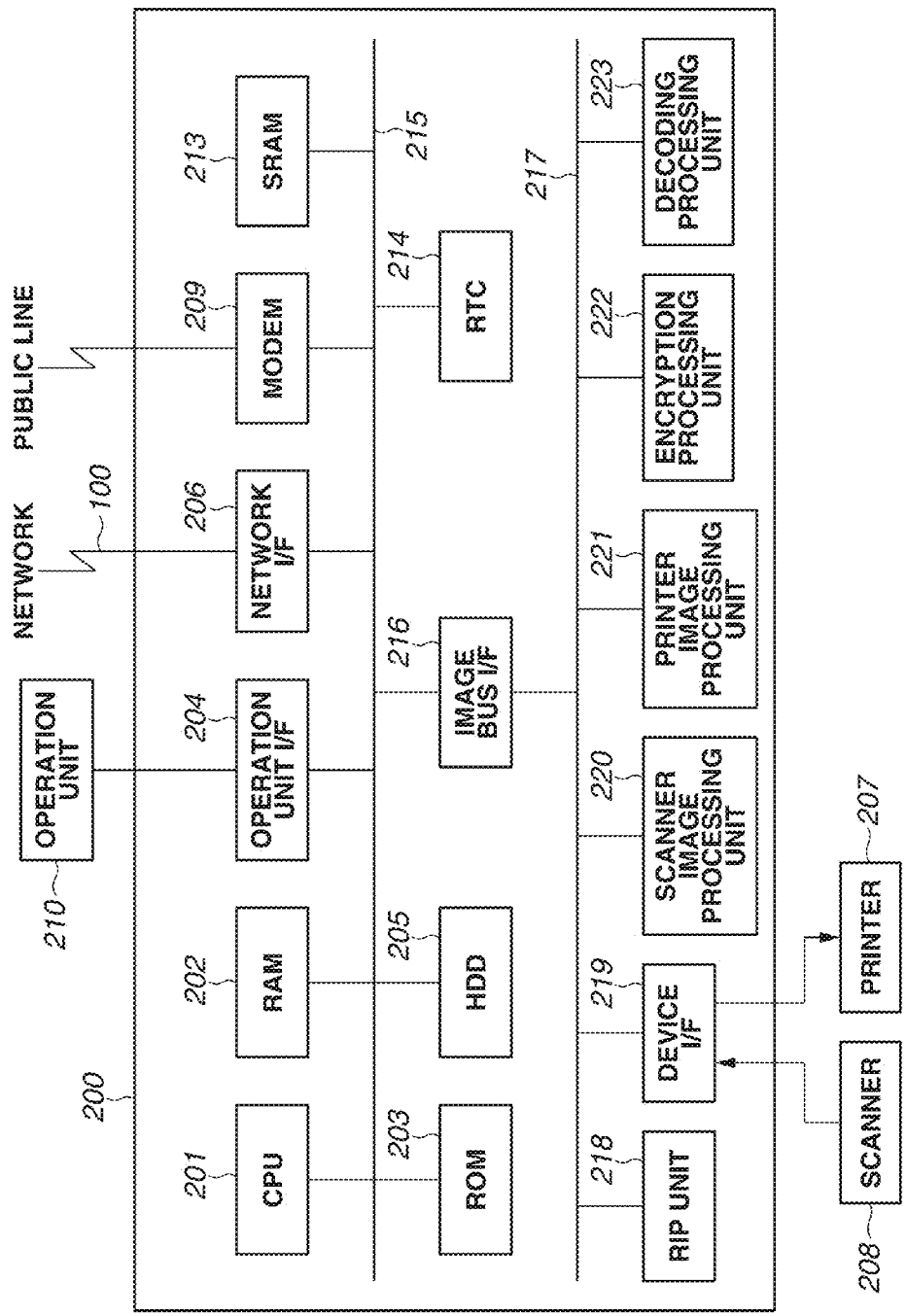
FIG. 2 is a block diagram illustrating a hardware configuration of an MFP.

FIG. 2 is a block diagram illustrating an example of a hardware configuration of the MFP 110.

The MFP 110 illustrated in FIG. 2 includes a control unit 200. The control unit 200 is connected to a scanner 208 (i.e., an image input device) and a printer 207 (i.e., an image output device). Further, the control unit 200 is connected to the network 100 and a public line to input and output image information and device information.

The control unit 200 includes a central processing unit (CPU) 201, which is a processor capable of controlling various operations to be performed by the MFP 110. The MFP 110 can communicate with the web server 120 and the matter management server 130 via a network interface 206 in response to an instruction from the CPU 201. Further, the MFP 110 can perform communications by using the HTTP protocol. For example, the MFP 110 can log in the web server 120, transmit a user instruction to a web application, receive print data, and transmit scan data. Further, the MFP 110 can log in the matter management server 130, receive authentication information, and perform data transmission/reception relating to registration of expense information (e.g., information about work expense in a specific matter handled by a person in charge in a law firm).

A random access memory (RAM) 202 is functionally operable as a main memory of the CPU 201, a system work memory that enables the CPU 201 to operate, and an image memory that can temporarily store image data. The RAM 202 stores internal setting information about the MFP and stores a job log and an operation log when each processing is performed.

A read only memory (ROM) 203 is a boot ROM, which stores a boot program of the system.

Figure 12B:
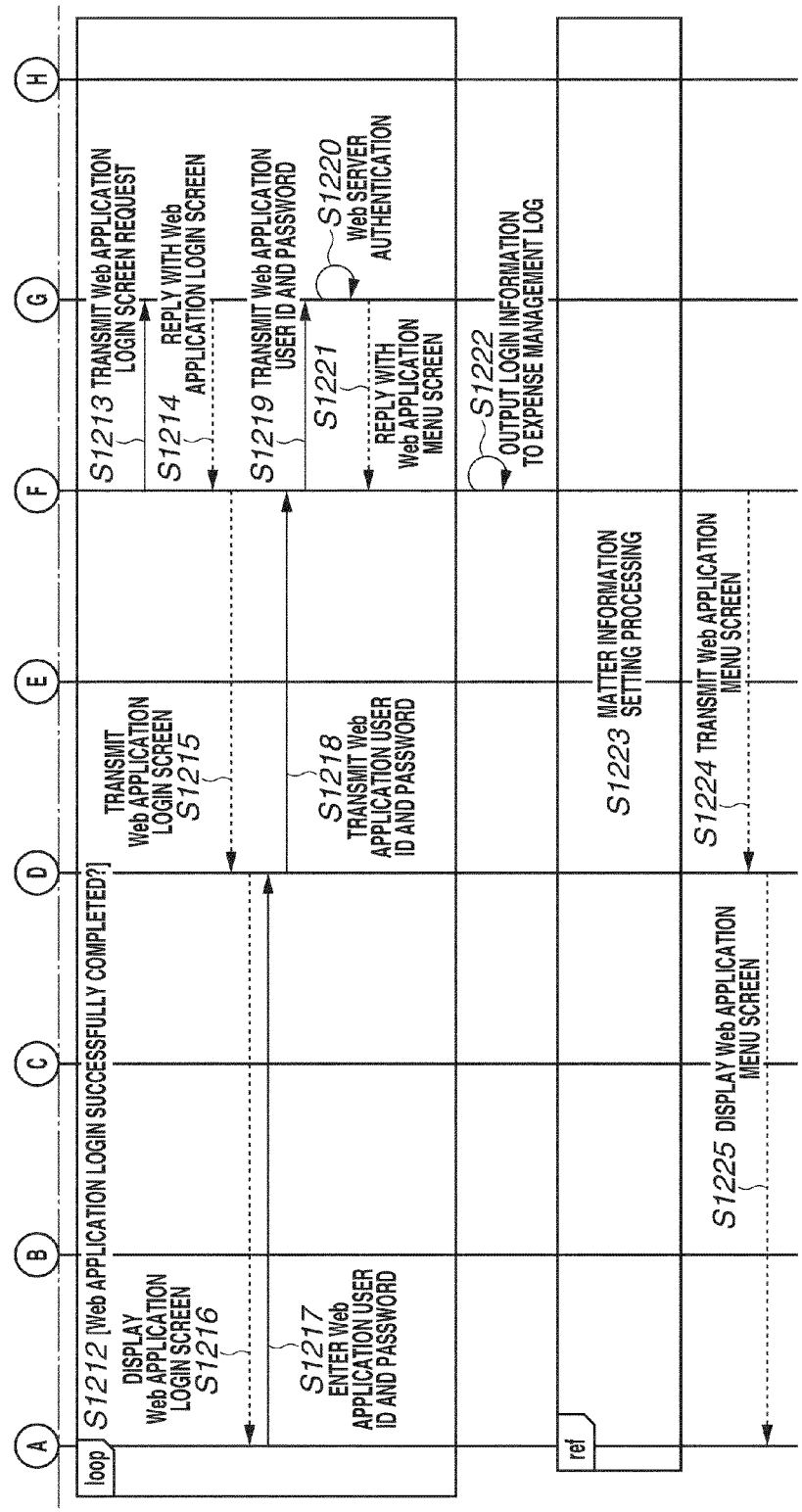
FIG. 12 (consisting of FIGS. 12A and 12B) is a sequence diagram illustrating initial setting processing according to the first exemplary embodiment.
Figure 15B:
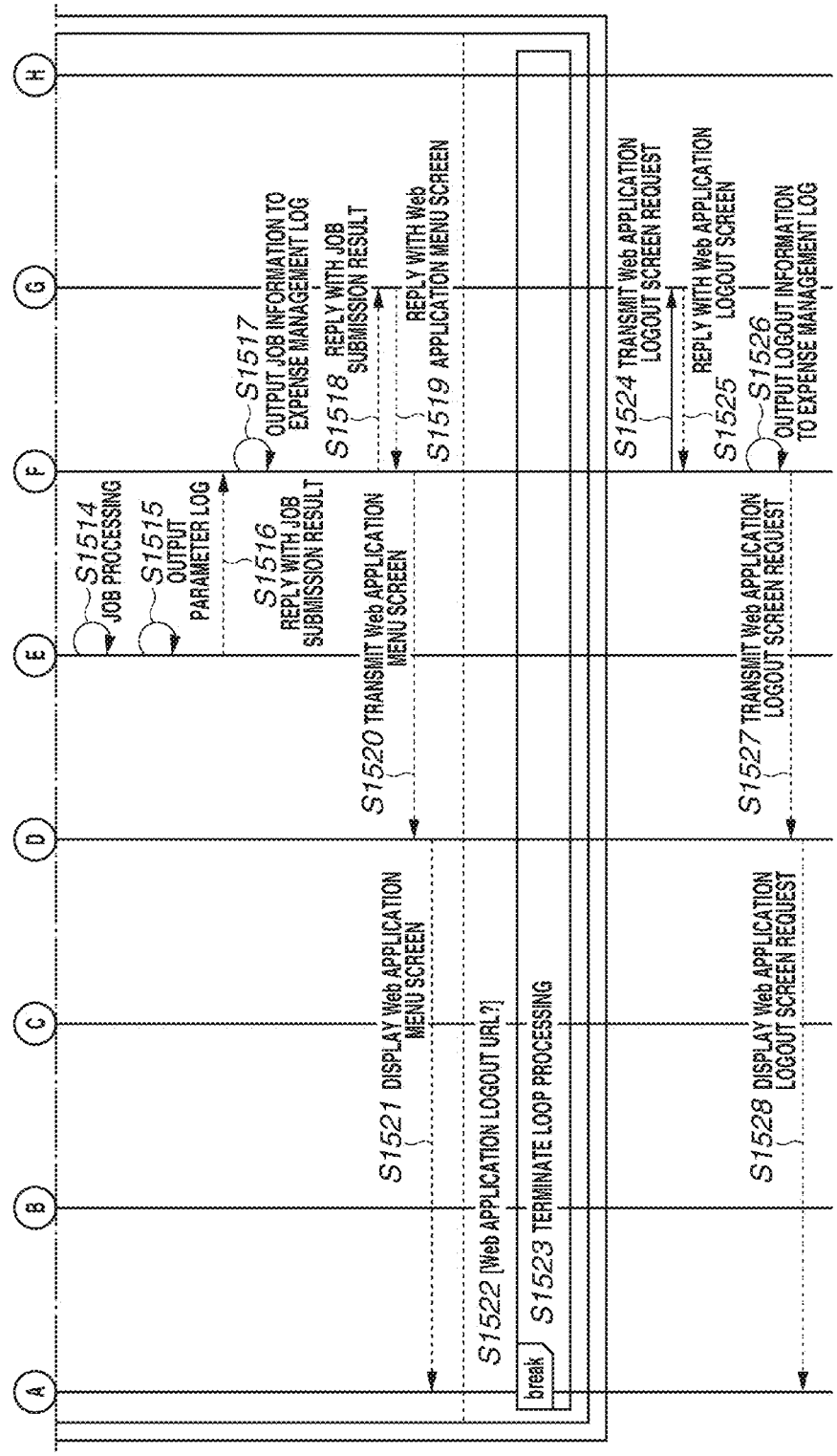
FIG. 15 (consisting of FIGS. 15A and 15B) is a sequence diagram illustrating web application execution processing according to the first exemplary embodiment.

A hard disk drive (HDD) 205 is a storage device storing system software, applications, and image data. Further, the HDD 205 stores programs of the MFP 110 that are necessary to execute below-described sequential processing illustrated in FIG. 12 (consisting of FIGS. 12A and 12B) (corresponding to FIG. 17 in a second exemplary embodiment and FIG. 21 in a third exemplary embodiment), FIG. 13, FIG. 14 (corresponding to FIG. 22 in the third exemplary embodiment), FIG. 15 (consisting of FIGS. 15A and 15B) (corresponding to FIG. 18 in the second exemplary embodiment and FIG. 23 in the third exemplary embodiment), and FIG. 16. The CPU 201 can execute each step of the above-mentioned sequential processing by reading and executing a corresponding program stored in the HDD 205. However, any other processor can execute each step of the above-mentioned sequential processing. Alternatively, the CPU 201 can cooperate with another processor to perform the processing of the above-mentioned sequence. The HDD can be replaced by or used together with a solid state drive (SSD) or any other storage apparatus.

An operation unit interface (I/F) 204 is capable of controlling the display of a display device, key inputs via the display device (e.g., a touch panel), and inputs via hard keys. The operation unit I/F 204 outputs image data to be displayed by an operation unit 210 to the operation unit 210. Further, the operation unit I/F 204 has a role to transmit information entered by a system user via the operation unit 210 to the CPU 201. The operation unit 210 includes a touch panel equipped display device, hard keys, and an IC card reader.

The network interface 206 is connected to the network 100 and is configured to perform information input/output processing. A MODEM 209 is connected to a public line and is configured to perform information input/output processing. A static random access memory (SRAM) 213 is a nonvolatile recording medium that can realize high-speed operations. A real-time clock (i.e., RTC) 214 can perform processing for continuously counting the time even in a state where the power source of the control unit 200 is not turned on. In the present exemplary embodiment, the RTC 214 can be used when the time relating to a job log or an operation log described below is stored in a storage apparatus. The above-mentioned devices are connected via a system bus 215.

An image bus I/F 216 connects the system bus 215 to an image bus 217 (i.e., a bus capable of speedily transferring image data). The image bus I/F 216 can convert a data structure. For example, the image bus 217 is a PCI bus or an IEEE1394 bus. The following devices are connected to the image bus 217.

A raster image processor (RIP) unit 218 can develop PDL data into a bitmap image. The scanner 208 and the printer 207 are connected to the control unit 200 via a device I/F 219. The device I/F 219 can perform synchronous/asynchronous conversion of image data. A scanner image processing unit 220 can perform correction, modification, and editing processing on input image data. A printer image processing unit 221 can perform printer correction and resolution conversion processing on print output image data. An encryption processing unit 222 can perform encryption processing on input data including image data. A decoding processing unit 223 can decode encrypted data.

<Hardware Configuration of Web Server 120 and Matter Management Server 130>

Figure 3:
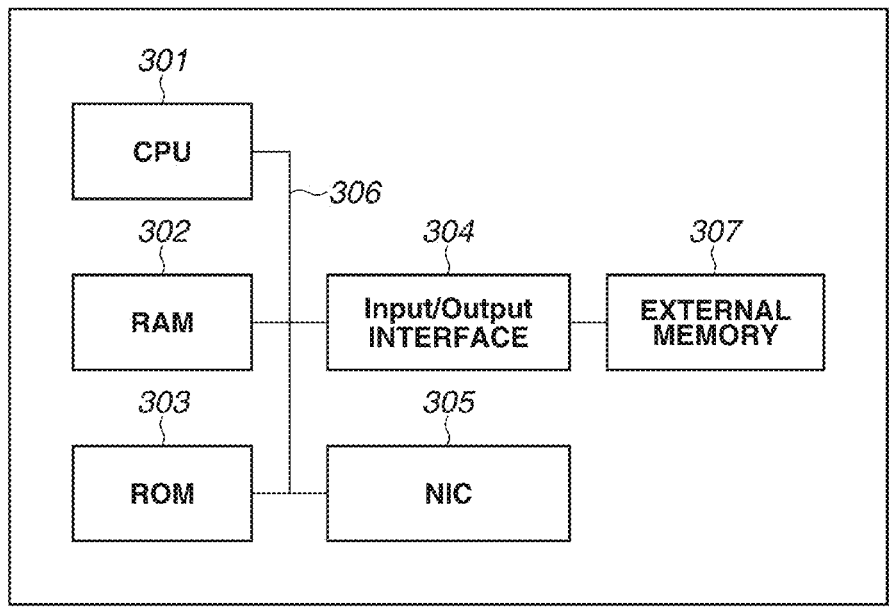
FIG. 3 is a block diagram illustrating a hardware configuration of a web server and a matter management server.

FIG. 3 is a block diagram illustrating an example hardware configuration of the web server 120 and the matter management server 130 illustrated in FIG. 1.

Each of the web server 120 and the matter management server 130 includes a CPU 301, a RAM 302, a ROM 303, an input/output interface 304, a network interface card (NIC) 305, and a bus 306.

The CPU 301 can read and execute an operating system (OS), general applications, and programs stored in a program ROM of the ROM 303 or in an external memory 307. Further, the CPU 301 can control various devices connected to the bus 306. The ROM 303 and the external memory 307 can store operating system programs (i.e., control programs of the CPU 301) and various data. The RAM 302 is functionally operable as a main memory or a work area of the CPU 301.

The input/output interface 304 can control the display of a display device (not illustrated), key input operations via the display device (e.g., a touch panel) or a keyboard, and can control operations for inputting/outputting data from/to the external memory 307.

The external memory 307 is a storage apparatus, such as a hard disk drive (HDD) or a solid state drive (SSD). In the case of the web server 120, the external memory 307 stores programs of the web server 120 that are necessary to execute below-described sequential processing in FIG. 12 (corresponding to FIG. 17 in the second exemplary embodiment and FIG. 21 in the third exemplary embodiment), FIG. 13, FIG. 14 (corresponding to FIG. 22 in the third exemplary embodiment), FIG. 15 (corresponding to FIG. 18 in the second exemplary embodiment and FIG. 23 in the third exemplary embodiment), and FIG. 16. Further, in the case of the matter management server 130, the external memory 307 stores programs of the matter management server 130 that are necessary to execute below-described sequential processing in FIG. 12 (corresponding to FIG. 17 in the second exemplary embodiment and FIG. 21 in the third exemplary embodiment), FIG. 13, FIG. 14 (corresponding to FIG. 22 in the third exemplary embodiment), FIG. 15 (corresponding to FIG. 18 in the second exemplary embodiment and FIG. 23 in the third exemplary embodiment), and FIG. 16. The CPU 301 can execute each step of the above-mentioned sequential processing by reading and executing a corresponding program stored in the external memory 307. However, any other processor can execute each step of the above-mentioned sequential processing. Alternatively, the CPU 301 can cooperate with another processor to perform the processing of the above-mentioned sequential processing.

The NIC 305 is connected to the network 100 and can perform processing for controlling communications with other devices (e.g., the MFP 110) connected to the same network 100.

<Software Configuration>

FIG. 4 is a block diagram illustrating an example of a software configuration of an expense information registration system relating to expense registration processing according to the present exemplary embodiment. Each block in the MFP 110 represents a function that can be realized when the CPU 201 of the MFP 110 reads and executes the programs stored in the HDD 205. Further, each block of the web server 120 represents a function that can be realized when the CPU 301 of the web server 120 reads and executes the programs stored in the external memory 307. Further, each block in the matter management server 130 represents a function that can be realized when the CPU 301 of the matter management server 130 reads and executes the programs stored in the external memory 307.

<Software Configuration of MFP 110>

The MFP 110 includes a login application 401, a menu application 402, a web browser 403, an HTTP communication unit 404, an expense management application 405, and a service provider 406. For example, the above-mentioned software modules are stored in the HDD 205 of the MFP 110. Each software module can be loaded into the RAM 202 from the HDD 205 and can be executed by the CPU 201.

The login application 401 is a software module that can perform authentication processing for identifying a user who uses the MFP 110 based on login information having been entered by the user and can generate login user information. The MFP 110 holds an internal list (e.g., in the HDD 205) including user information about users who can use the MFP 110 and usable functions. For example, as a practical login method, a user can input user ID and a password through a login screen (e.g., FIG. 8) and a software keyboard displayed on the operation unit 210. A method using an IC card is also employable. In the present exemplary embodiment, the MFP 110 constantly holds user information as the internal list. However, the MFP 110 can be configured to transmit the input authentication information to an external user information management server and receive authenticated login information from the external user information management server.

The menu application 402 is a software module that can display a menu (e.g., FIG. 9) usable to launch each software module of the MFP 110. The menu application 402 displays a list of GUI buttons usable to display a copy screen and a web browser screen described below, which allows a user to select a desired function.

The web browser 403 is a web browser that can perform communications, via the HTTP communication unit 404, with the expense management application 405 and other applications of the MFP 110 and also other devices accessible via the network. For example, the web browser 403 can access a service (such as a web application) whose function can be provided by the web server 120 in cooperation with the MFP 110. The web browser 403 requests a web application corresponding to a designated URL to transmit HTML data. Further, the web browser 403 renders HTML data included in a response received via the HTTP communication unit 404. Then, the web browser 403 causes the operation unit 210 to display the rendered HTML data (e.g., FIGS. 9 to 11). Further, the web browser 403 transmits an input entered via an operation screen displayed by the operation unit 210, as a request, to the web application. An application other than the web browser can be used if it can access a service (such as a web application) whose function can be provided by the web server 120 in cooperation with the MFP 110.

The HTTP communication unit 404 is a software module that can operate the network I/F 206 and can perform communications by using the HTTP protocol.

The expense management application 405 can relay communications via the HTTP communication unit 404 performed between the web browser 403 and the web server 120. The expense management application 405 can receive a request sent from the web browser 403 to the web server 120 and perform processing according to a transmission URL and received data. Further, on behalf of the web browser 403, the expense management application 405 can perform data communications with the web server 120 and the matter management server 130. Further, the expense management application 405 can relay a response from the web server 120 to the web browser 403 via the HTTP communication unit 404 and can perform processing according to the received data and URL. Further, on behalf of the web server 120, the expense management application 405 can perform data communications with the web browser 403. Thus, the expense management application 405 can cause the web browser 403 to display a matter management server login screen 900 illustrated in FIG. 9, a matter setting screen 1000 illustrated in FIG. 10, and a web application login screen (usable to set each matter) 2000 illustrated in FIG. 20 (third exemplary embodiment), in addition to the screens provided by the web server 120.

Further, the expense management application 405 can communicate with the matter management server 130 via the HTTP communication unit 404 to log in the matter management server 130, acquire matter information from the matter management server 130, and register expense information to the matter management server 130.

Further, the expense management application 405 can relay communications via the HTTP communication unit 404 performed between the web server 120 and the service provider 406. The expense management application 405 receives a request sent from the web server 120 to the service provider 406 and performs processing according to received data. Further, on behalf of the web server 120, the expense management application 405 can perform data communications with the service provider 406. Further, the expense management application 405 can relay a response from the service provider 406 to the web server 120 via the HTTP communication unit 404 and can perform processing according to the received data and URL. Further, on behalf of the web server 120, the expense management application 405 can perform data communications with the service provider 406. Therefore, it is feasible to acquire the content of a job instruction transmitted from the web server 120 to the service provider 406 and the content of a job execution result returned from the service provider 406.

Further, the expense management application 405 can internally store authentication information received from the matter management server 130 (see 510 illustrated in FIG. 5A). Further, the expense management application 405 can internally hold an expense management log (e.g., log 530 illustrated in FIG. 5B). The expense management application 405 can store, in the expense management log, information relating to the above-mentioned processing, such as login to the web server 120, logout from the web server 120, and user selection of matter information on the matter setting screen (e.g., matter setting screen 1000 illustrated in FIG. 10 or web application login screen 2000 illustrated in FIG. 20).

The expense management application 405 can monitor the internally held expense management log (see device user name 503 illustrated in FIG. 5A) and a parameter log constantly held by the service provider 406 (see FIG. 7 (consisting of FIGS. 7A and 7B)). Further, the expense management application 405 can acquire expense information relating to the web application and causes the matter management server 130 to register the expense information (see expense information 620 illustrated in FIG. 6).

The service provider 406 can execute a job by using the hardware resources of the MFP 110 according to a request received from the web server 120 via the HTTP communication unit 404. For example, the service provider 406 can perform job execution, including print processing, scan processing, FAX processing, and transmission processing performed by the MFP 110. The service provider 406 can acquire a job result after completing the job execution, output the acquired job result to the internally held parameter log, and return a response including the job result to the a request source.

<Software Configuration of Web Server 120>

The web server 120 includes a UI application 411, a main control program 412, and an HTTP communication unit 413, which cooperatively constitute a software configuration. For example, the above-mentioned software modules are stored in the external memory 307 of the web server 120. Each software module can be loaded into the RAM 302 from the external memory 307 and can be executed by the CPU 301.

The UI application 411 can transmit a response including a screen to be displayed, via the HTTP communication unit 413, in response to an HTTP request from the web browser. Further, the UI application 411 can receive form data if it has been entered via the screen displayed by the web browser, via the HTTP communication unit 413.

The main control program 412 can control the web server 120. In response to an input from a user or another device, the UI application 411 and the HTTP communication unit 413 can request the main control program 412 to perform required processing.

The UI application 411 can perform processing corresponding to a request from the web browser of the MFP 110 via the network 100, and can return a response including HTML data to be displayed by the web browser of the MFP 110.

The HTTP communication unit 413 is a software module that can operate the NIC 305 to perform communications by using the HTTP protocol.

Further, the main control program 412 can perform processing on the form data sent from the UI application 411. For example, the main control program 412 can perform authentication processing based on user information entered by using the form of an authentication screen (see FIG. 11A) and can instruct a screen to be displayed. Further, the main control program 412 can generate job definition information, which is required to execute the job using the device function of the MFP, according to the information entered by a user via the job execution form (see FIG. 11C) and can transmit a job execution request to the MFP 110 via the HTTP communication unit 413. Further, the main control program 412 can receive a job execution result from the MFP 110 and can instruct the UI application 411 to display a result screen according to the received result.

<Software Configuration of Matter Management Server 130>

The matter management server 130 can manage the expense information in association with each matter. The matter management server 130 includes a UI application 421, a main control program 422, an HTTP communication unit 423, a user management application 424, a matter management application 425, and an expense management application 426, which cooperatively constitute a software configuration. For example, the above-mentioned software modules are stored in the external memory 307 of the web server 120. Each software module can be loaded into the RAM 302 from the external memory 307 and can be executed by the CPU 301.

The UI application 421 can transmit a response including screens to be displayed (see FIGS. 9 and 10) via the HTTP communication unit 423 in response to an HTTP request from the web browser. Further, the UI application 421 can receive form data entered via the screen displayed by the web browser via the HTTP communication unit 423.

The main control program 422 can control the matter management server 130. In response to an input from a user or another device, the UI application 421 and the HTTP communication unit 423 can request the main control program 422 to perform required processing.

The UI application 421 can perform processing corresponding to a request from the web browser of the MFP 110 via the network 100, and can return a response including HTML data to be displayed by the web browser of the MFP 110. The communication can be performed by using the HTTP protocol.

The HTTP communication unit 423 can provide interfaces usable, for example, when the MFP 110 transmits a request to the matter management server 130. For example, the HTTP communication unit 423 provides a login request interface, an expense information registration request interface, and a user data acquisition request interface, which an external device can use to transmit requests to the matter management server 130. The HTTP communication unit 423 can notify the main control program 422 of the request received from each interface. The main control program 422 communicates with the user management application 424, the matter management application 425, and the expense management application 426 according to the processing content and performs processing corresponding to the request.

The user management application 424 can manage a user who uses the matter management server 130 and can control the management of user setting information and the right to access each function for each user. The user setting information can be read from the external memory 307 of the matter management server 130 and stored in the RAM 302

(see, matter management server user information 600 illustrated in FIG. 6). An authentication request can be requested from the HTTP communication unit 423 via the network 100. If the user management application 424 receives the above-mentioned authentication request, the user management application 424 reads required data (e.g., the user setting information) from the RAM 302 and performs authentication processing by collating ID and password information included in the authentication request with the read-out data.

The matter management application 425 can manage each matter. More specifically, the matter management application 425 causes the UI application 421 of the matter management server 130 to display a matter registration screen when a matter generation request from a user is detected and generates matter information (see matter information 610 in illustrated in FIG. 6). For example, the matter information is associated with matter name, information about each person in charge, information about a client of the law firm, and information about a work expense required for the matter. The matter management server 130 stores the information managed by the matter management application 425 in the RAM 302 of the matter management server 130 and refers to the stored information if necessary.

The expense management application 426 can perform processing for registering, deleting, and changing the expense information in response to an instruction from the UI application 421 or the HTTP communication unit 423. The expense information according to the present exemplary embodiment is information about work expense required for a specific matter handled by a person in charge in the law firm (see expense information 620 illustrated in FIG. 6). For example, each piece of expense information includes items of matter ID, expense name, expense amount, and unit of expense. Each item will be described in detail below.

<Data Configuration of MFP 110>

FIGS. 5A and 5B illustrate example configurations of the information used by the MFP 110 according to the present exemplary embodiment. The information illustrated in FIGS. 5A and 5B is stored in the RAM 202 or the HDD 205 of the MFP 110 or in an external memory, and can be processed by the software modules of the MFP 110 illustrated in FIG. 4.

<Device User Information 500>

The device user information 500 is user information used by the MFP 110.

The device user information 500 includes a device user ID 501 (ID allocated to a user of the MFP 110), a device user password 502 to be used in user authentication, and a device user name 503 representing a user name. The device user information 500 can be managed by the login application 401 of the MFP 110 and can be stored, for example, in the RAM 202 or the HDD 205.

<Matter Management Server Authentication Information 510>

The matter management server authentication information 510 is matter management server user information usable when the MFP 110 requests the matter management server 130 to perform authentication. The matter management server authentication information 510 is managed in association with the device user information 500. The matter management server authentication information 510 includes a device user ID 511 (similar to ID 501) allocated to the device user, a matter management server ID 512 required to identify the matter management server 130, a matter management server URL 513 representing URL of the matter management server 130, and a matter management server user ID 514 required to identify a user of the matter management server 130. Further, the matter management server authentication information 510 includes a matter management server authentication token 515 as authentication information usable when the MFP 110 requests the matter management server 130 to perform authentication. The matter management server authentication information 510 can be managed by the expense management application 405 of the MFP 110 and stored, for example, in the RAM 202 or the HDD 205.

<Web Application Information 520>

The web application information 520 is information required when accessing the web application of the web server 120 from the MFP 110. The web application information 520 includes a web application ID 521 required to identify the web application and a web application name 522 representing a name of the web application. Further, the web application information 520 includes a web application login URL 523 representing URL required to log in the web application, and a web application logout URL 524 required to log out of the web application. Further, the web application information 520 includes a matter setting screen information ID 525 indicating the information required to display the matter setting screen illustrated in FIG. 10 or FIG. 20. The web application information 520 can be managed by the expense management application 405 of the MFP 110 and stored, for example, in the RAM 202 or the HDD 205.

<Expense Management Log 530>

The expense management log 530 can be used by the expense management application 405 of the MFP 110 to store information about a cooperative operation performed by the web browser 403 and the web application of the web server 120. The expense management log 530 is expense management information to be used when the expense information is registered to the matter management server 130. Matter information selected by a user can be stored in the expense management log 530.

The expense management log 530 includes a web application ID 531 (similar to ID 521) required to identify the web application, a category 532 representing the type of each cooperative operation, a device user ID 533 (similar to ID 501) representing a device user ID when the cooperative operation is performed, and details 534 representing details of the cooperative operation.

For example, according to the example illustrated in FIG. 5B, when the web browser 403 has logged in the web server 120, a data "login" is added to the category 532, as illustrated in the first line.

Further, when a user has performed matter setting on the matter setting screen (see FIG. 10 or FIG. 20) provided by the web browser 403, data "matter information" is added to category 532 in association with a matter ID (e.g., "M0001") selected by the user, as illustrated in the second line.

Further, in a case where a user sends an instruction to the web server 120 via the web browser 403, the web server 120 may request the service provider 406 to execute a job. In such a case, when a job execution result is returned, a data "job" is recorded in the category 532, as illustrated in the third line or the fourth line.

Further, when the web browser 403 has logged out of the web server 120, data "logout" is added to the category 532 as illustrated in fifth line.

The expense management log 530 can be managed by the expense management application 405 of the MFP 110 and stored, for example, in the RAM 202 or the HDD 205.

Although the expense management log 530 illustrated in FIG. 5B has a database format, the expense management log 530 can be configured to have a text file format structured using Extensible Markup Language (XML) data and comma-delimited data.

<Matter Setting Screen Information 540>

The matter setting screen information 540 is setting information indicating whether to display the matter setting screen in response to a request from the web browser 403, depending on URL of the screen, when accessing a web application of the web server 120 from the MFP 110.

The matter setting screen information 540 includes a matter setting screen information ID 541 (similar to ID 525) required to identify the matter setting screen information, a matter setting screen display URL 542 representing a URL where the matter setting screen is displayed, and a merging display 543 indicating whether to realize a merging display of the matter setting screen.

If the indication of the merging display 543 is "Y", the display can be realized in such a way as to merge the matter setting screen with the web application screen illustrated in FIG. 11. If the indication of the merging display 543 is "N", the merging display is not realized. The merging display 543 is used in the third exemplary embodiment.

The matter setting screen information 540 can be managed by the expense management application 405 of the MFP 110 and stored, for example, in the RAM 202 or the HDD 205.

<Billing Information 550>

The billing information 550 is information required to calculate the amount of money (i.e., the expense) relating to a matter required as a result of accessing the web application of the web server 120 from the MFP 110.

The billing information 550 includes a job 551 representing the category of each job, a color 552 representing color information, a size 553 representing paper size information, and an amount of money 554 indicating a unit price.

The billing information 550 can be managed by the expense management application 405 of the MFP 110 and stored, for example, in the RAM 202 or the HDD 205.

<Data Configuration of Matter Management Server 130>

FIG. 6 illustrates an example configuration of information used by the matter management server 130 according to the present exemplary embodiment. The information illustrated in FIG. 6 is stored in the RAM 302 or the external memory 307 of the matter management server 130, and can be processed by the software modules of the matter management server 130 illustrated in FIG. 4.

<Matter Management Server User Information 600>

The matter management server user information 600 indicates information about a user who uses the matter management server 130. The matter management server user information 600 includes a matter management server user ID 601 (similar to ID 514 in FIG. 5A) as ID information allocated to a user of the matter management server 130, a matter management server password 602 to be used in user authentication, and a matter management server user name 603 indicating a user name. Further, the matter management server user information 600 includes a matter management server authentication token 604 (similar to matter management server authentication token 515 in FIG. 5A) as authentication token required in authentication when accessing the matter management server 130 from the MFP 110.

The matter management server user information 600 can be managed by the user management application 424 of the matter management server 130 and stored in the RAM 302 or the external memory 307 of the matter management server 130.

<Matter Information 610>

The matter information 610 is information relating to each matter stored in the matter management server 130. The matter information 610 includes a matter ID 611 allocated to each matter, a matter name 612 indicating a name of the matter, and a responsible user ID 613 (similar to ID 601) indicating a person in charge of the matter.

The matter information 610 can be managed by the matter management application 425 of the matter management server 130 and stored in the RAM 302 or the external memory 307 of the matter management server 130.

<Expense Information 620>

The expense information 620 indicates expense related information usable in billing for each matter stored in the matter management server 130. The expense information 620 includes a matter ID 621 (similar to ID 611) indicating an associated matter, an expense ID 622 allocated to each expense, an expense name 623 indicating a name of each expense, an amount of expense 624 indicating the value of each expense, and a unit of expense 625 representing the unit of the expense amount.

The expense information 620 can be managed by the expense management application 426 of the matter management server 130 and stored in the RAM 302 or the external memory 307 of the matter management server 130.

<Data Configuration of Parameter Log>

FIG. 7 (consisting of 7A and 7B) illustrates a data example of the parameter log output by the service provider 406 of the MFP 110. The parameter log illustrated in FIG. 7 is stored in the RAM 202 or the HDD 205 of the MFP 110 or in an external memory (not illustrated) connected to the network I/F 206. The parameter log illustrated in FIG. 7 can be output by the service provider 406 of the MFP 110 illustrated in FIG. 4 and monitored and referred to by the expense management application 405.

<Parameter Log 700>

Each time when the service provider 406 executes a job, the service provider 406 outputs information relating to the executed job to the parameter log 700. Hereinbelow, the parameter log 700 will be described in detail.

The parameter log 700 includes a requestUserName tag 701, a jobName tag 702, and a totalPageCount tag 703. Further, the parameter log 700 includes a colorPageCount tag 704, an isoA3 tag 705, and an isoA4 tag 706. Further, the parameter log 700 includes a monoPageCount tag 707, an isoA3 tag 708, and an isoA4 tag 709. Further, the parameter log 700 includes a requestFrom tag 710, a jobNumber tag 711, and a result tag 712.

Tags 713 to 724 are similar to the above-mentioned tags 701 to 712 and therefore redundant description thereof will be avoided.

Each time when the service provider 406 executes a job, the service provider 406 outputs a series of logs, including the requestUserName tag to the result tag (requestUserName tag 701 to result tag 712 and requestUserName tag 713 to result tag 724 illustrated in FIG. 7).

The example illustrated in FIG. 7 is a first series of logs, including the requestUserName tag 701 to the result tag 712, output when the service provider 406 executes a job, and a second series of logs, from the requestUserName tag 713 through the result tag 724, output when the service provider 406 executes the next job.

According to the example illustrated in FIG. 7, although the parameter log 700 includes a set of logs 701 to 712 and another set of logs 713 to 724, the parameter log 700 can be constituted by only one set of logs or can include three or more sets of logs.

The requestUserName tag 701 is an element representing a user ID of the MFP 110 when the service provider 406 receives a job. The jobName tag 702 is an element representing a job name received from the web server 120 when the service provider 406 receives a job. The totalPageCount tag 703 is an element representing the total number of pages used in a job executed by the service provider 406.

The colorPageCount tag 704 is an element representing the number of color pages used in a job executed by the service provider 406. The isoA3 tag 705 is an element representing the number of A3 color pages used in a job executed by the service provider 406. The isoA4 tag 706 is an element representing the number of A4 color pages used in a job executed by the service provider 406.

The monoPageCount tag 707 is an element representing the number of monochrome pages used in a job executed by the service provider 406. The isoA3 tag 708 is an element representing the number of monochrome A3 pages used in a job executed by the service provider 406. The isoA4 tag 709 is an element representing the number of monochrome A4 pages used in a job executed by the service provider 406. Although the example illustrated in FIG. 7 includes only A3 and A4 as information relating to the page size, the parameter log 700 can include information about any page size that can be processed by the service provider 406. As mentioned above, the parameter log 700 can include information about pages processed by a job having been executed by the service provider 406, such as the total number of pages and/or the number of pages classified according to a designated category (e.g., page size, monochrome, or color).

The requestFrom tag 710 is an element representing a URL of the web server 120 (i.e., the request source) when the service provider 406 has executed a job. The jobNumber tag 711 is an element representing a job identification number to be returned to the web server 120 (i.e., the request source) when the service provider 406 has executed a job. The result tag 712 is an element representing the result of a job executed by the service provider 406.

<Screen of MFP 110>

Figure 8:
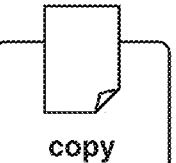
FIG. 8 is a diagram illustrating an example of screens of the MFP.

FIG. 8 illustrates an example screen of the MFP 110.

In FIG. 8, a device login screen 800 is a login screen displayed by the login application 401 when a user logs in the MFP 110. The device login screen 800 includes a device user ID input area 801 and a device user password input area 802. Further, the device login screen 800 includes a login button 803 that is operable to start authentication processing based on the content entered via the device login screen 800.

A device menu screen 810 is a menu screen to be displayed by the menu application 402 in a state where the user's operation to log in the MFP 110 has been completed. The device menu screen 810 includes a GUI button "copy" 811 that is operable to launch a copy application, a GUI button "send" 812 that is operable to launch a transmission application, and a GUI button "box" 813 that is operable to launch a document saving application. Further, the device menu screen 810 includes GUI buttons 814, 815, and 816 that are operable to launch the web browser 403 to acquire a specific URL. Further, the device menu screen 810 includes a GUI button 817 operable when a user logs out of the MFP 110.

According to the example illustrated in FIG. 8, it is assumed that the web browser 403 performs acquisition and display of URL information based on parameters of URL of the expense management application 405 and the value (e.g., "WS0001") of the web application ID 521, if the GUI button 815 is pressed.

<Matter Management Server Login Screen 900>

Figure 9:
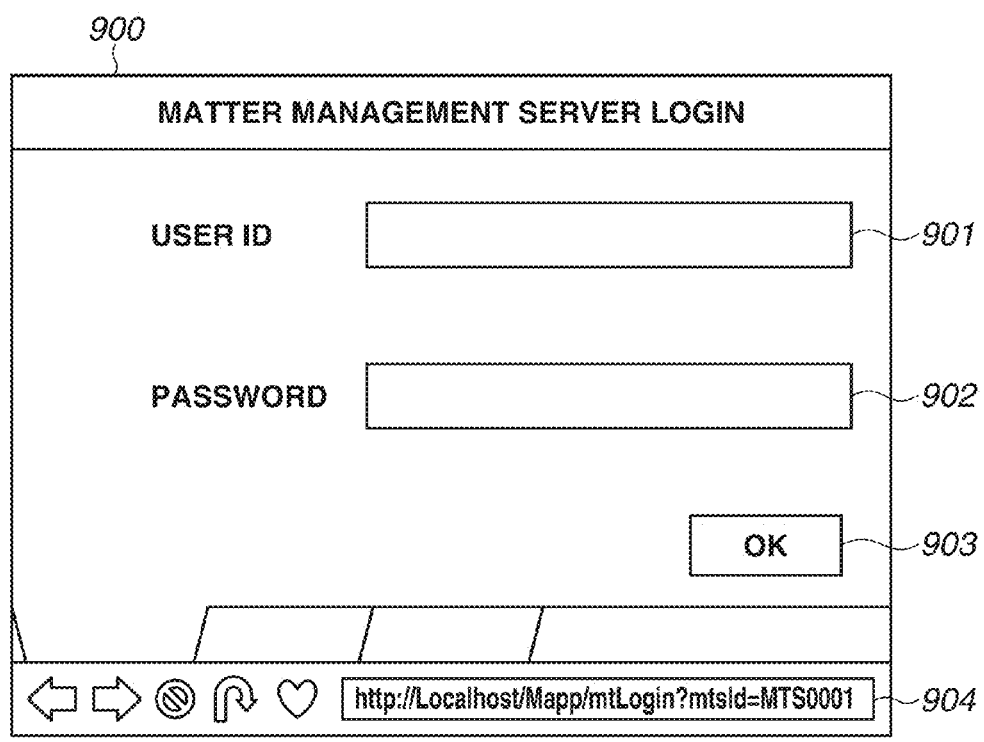
FIG. 9 is a diagram illustrating an example of matter management server login screen.

FIG. 9 illustrates the matter management server login screen 900 that can be displayed by the web browser 403.

The matter management server login screen 900 is a screen usable to send an authentication request from the web browser 403 to the matter management application 425. The matter management server login screen 900 can be acquired by the expense management application 405 from the matter management server 130 according to a request from the web browser 403 and can be displayed by the web browser 403.

The matter management server login screen 900 includes a matter management server user ID input area 901 and a matter management server password input area 902. Further, the matter management server login screen 900 includes an OK button 903 that is operable to start authentication processing based on the content entered via the matter management server login screen 900. Further, the matter management server login screen 900 includes a display area of a URL 904 that includes, as parameters, a URL of the expense management application 405 and a matter management server ID required to identify the matter management server.

<Matter Setting Screen 1000>

Figure 10:
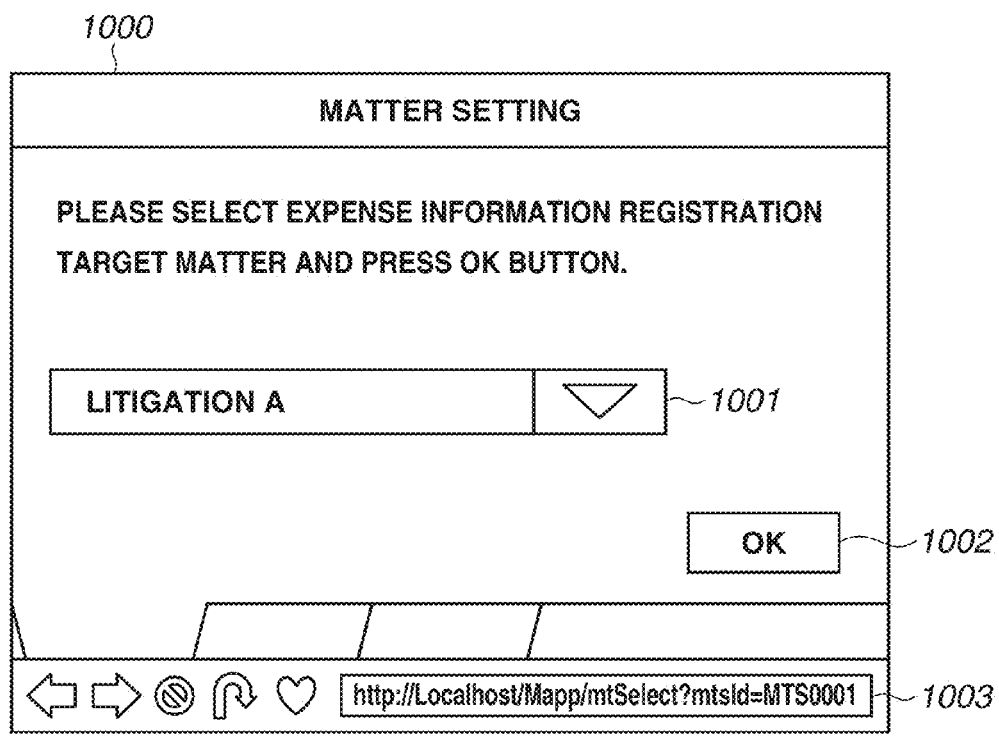
FIG. 10 is a diagram illustrating an example of a matter setting screen.

FIG. 10 illustrates an example of the matter setting screen of the expense management application 405 displayed by the web browser 403.

The matter setting screen 1000 is a screen usable when a user sets a matter whose expense information is to be registered to the expense management application 405, on the web browser 403. The matter setting screen 1000 can be displayed by the web browser 403 based on the matter information acquired by the expense management application 405 from the matter management server 130 according to a request from the web browser 403.

The matter setting screen 1000 includes a matter information selection area 1001 in which a user can select a matter whose expense is to be registered. The expense management application 405 acquires a matter management server user associated with the device user and acquires a matter corresponding to the matter management server user from the matter management server 130. The expense management application 405 displays the acquired matter in the matter information selection area 1001. More specifically, a user presently logging in the MFP 110 can select the matter corresponding to the above-mentioned user in the matter information selection area 1001.

Further, the matter setting screen 1000 includes an OK button 1002 operable to start matter setting processing based on the content entered via the matter setting screen 1000. Further, the matter setting screen 1000 includes a URL display area 1003 that includes, as parameters, a URL of the expense management application 405 and matter management server ID required to identify the matter management server.

<Matter Management Server Login Screen>

Figure 11A:
FIGS. 11A, 11B, and 11C are diagrams illustrating examples of web application screens according to a first exemplary embodiment.
Figure 11B:
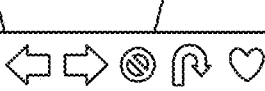
Figure 11C:
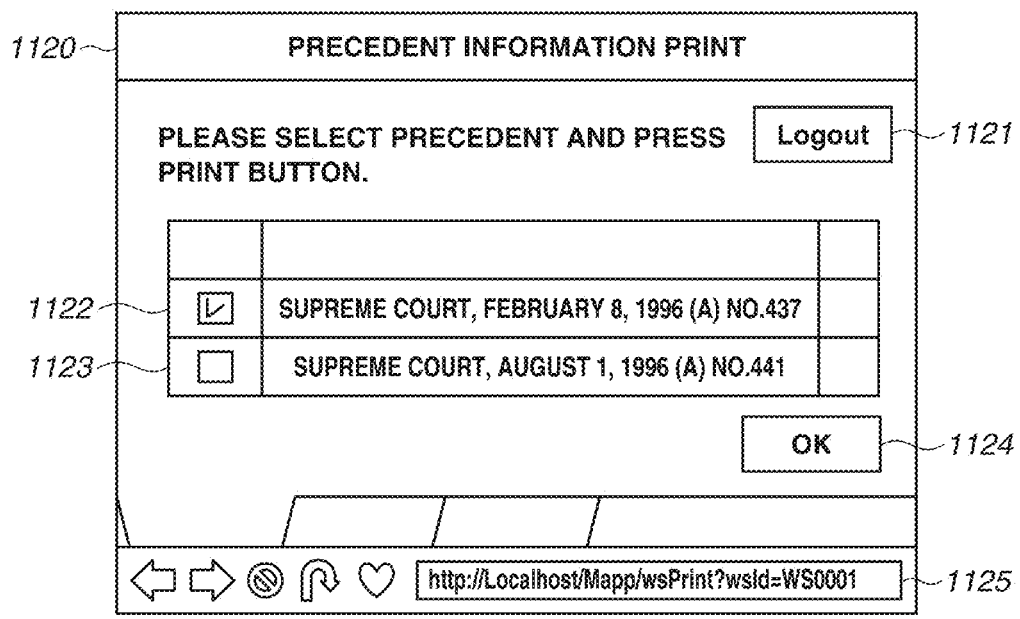

FIGS. 11A, 11B, and 11C illustrate web application screens of the web server 120 displayed by the web browser 403.

A web application login screen 1100 illustrated in FIG. 11A is a screen usable when a user logs in the web application via the web browser 403. The web application login screen 1100 can be acquired by the expense management application 405 from the web server 120 according to a request from the web browser 403 and can be displayed by the web browser 403.

The web application login screen 1100 includes a web application user ID input area 1101 and a web application password input area 1102. Further, the web application login screen 1100 includes a login button (OK button) 1103 that is operable to start authentication processing based on the content entered via the web application login screen 1100. Further, the web application login screen 1100 includes a URL display area 1104 that includes, as parameters, a URL of the expense management application 405 and a web application ID required to identify the web application.

A web application menu screen 1110 illustrated in FIG. 11B is a screen usable for menu selection of web application processing by a user via the web browser 403. The web application menu screen 1110 can be acquired by the expense management application 405 from the web server 120 according to a request from the web browser 403 and can be displayed by the web browser 403.

The web application menu screen 1110 includes a logout button 1111 that is operable to start an operation for logging out of the web application. Further, the web application menu screen 1110 includes menu buttons 1112, 1113, and 1114 that are operable to start various processing of the web application. Further, the web application menu screen 1110 includes a URL display area 1115 that includes, as parameters, a URL of the expense management application 405 and a web application ID required to identify the web application.

The web application processing screen 1120 illustrated in FIG. 11C is a screen usable to instruct the content of processing to be performed by a web application via the web browser 403. The web application processing screen 1120 can be acquired by the expense management application 405 from the web server 120 according to a request from the web browser 403 and can be displayed by the web browser 403.

The web application processing screen 1120 includes a logout button 1121 that is operable to start a logout operation from the web application. Further, the web application processing screen 1120 includes input areas 1122 and 1123 in which web application job settings can be performed. The screen example illustrated in FIG. 11C includes an input area in which a document to be printed can be selected as a setting of the job. Further, the web application processing screen 1120 includes an OK button 1124 that is operable to start processing according to the content entered via the web application processing screen 1120. Further, the web application processing screen 1120 includes a display area URL 1125 that includes, as parameters, a URL of the expense management application 405 and a web application ID required to identify the web application.

<Initial Setting Sequence>

Next, a sequential processing procedure, which includes matter management server authentication processing to be performed as initial setting after a user starts operating the MFP 110 and processing for logging in the web server 120, will be described in detail below with reference to FIG. 12.

FIGS. 12 to 16 illustrate examples of sequential processing that can be performed by the software components of the MFP 110, the web server 120, and the matter management server 130 according to the first exemplary embodiment. In FIGS. 12 to 16, the processing to be performed by the MFP 110 can be realized by the CPU 201 of the MFP 110 by reading and executing the programs stored in the HDD 205. Further, the processing to be performed by the web server 120 can be realized by the CPU 301 of the web server 120 by reading and executing the programs stored in the external memory 307. Further, the processing to be performed by the matter management server 130 can be realized by the CPU 301 of the matter management server 130 by reading and executing the programs stored in the external memory 307.

First, an initial setting sequence, i.e., sequential processing including matter management server authentication processing to be performed as initial setting after a user starts operating the MFP 110 and processing for logging in the web server 120, will be described in detail below with reference to FIG. 12.

FIG. 12 is a sequence diagram illustrating initial setting processing according to the first exemplary embodiment.

First, in step S1201, a user starts operating the MFP 110 using a display device and/or hard keys of the operation unit 210 to perform web application processing. In this case, if the MFP 110 is in a power saving state, the MFP 110 can detect the entry via a button when the button is pressed by the user. If the user operation is detected, the operation proceeds to loop processing of steps S1202 to S1205.

First, in step S1202, the login application 401 determines whether the device login processing has been successfully completed. If the login application 401 determines that the device login processing is not yet successfully completed, the operation proceeds to step S1203.

In step S1203, the login application 401 causes the operation unit 210 to display the device login screen 800 illustrated in FIG. 8. If the MFP 110 is not in the power saving state when the user operation starts in the above-mentioned step S1201, the device login screen 800 illustrated in FIG. 8 is already displayed at the timing of the above-mentioned step S1201.

In step S1204, if the login application 401 detects the pressing of the login button 803 after a user ID and a password have been entered by the user on the device login screen 800, the operation proceeds to step S1205.

In step S1205, the login application 401 performs device user authentication processing. In the device user authentication processing, the login application 401 performs authentication by determining whether the user ID and the password entered by the user in the above-mentioned step S1204 coincide with the device user ID 501 and the device user password 502 held by the login application 401. After the device user authentication processing has been completed, the operation of the login application 401 returns to step S1202 again.

Then, in the above-mentioned step S1202, if it is determined that the device login processing has been failed, the login application 401 performs the above-mentioned processing again in steps S1203 to S1205. On the other hand, if it is determined that the device login processing has been successfully completed, the login application 401 terminates the above-mentioned loop processing. Then, the operation proceeds to step S1206.

In step S1206, the login application 401 requests the menu application 402 to display the device menu screen 810 illustrated in FIG. 8.

In step S1207, if the above-mentioned request has been received, the menu application 402 causes the operation unit 210 to display the device menu screen 810 illustrated in FIG. 8.

Next, in step S1208, if the pressing of the GUI button 815 or 816 of the web application (i.e., one of the menu buttons displayed on the device menu screen 810) by the user is detected, the menu application 402 starts the following web application processing. In the following description, it is assumed that the button pressed by the user is the GUI button 815.

First, in step S1209, the menu application 402 instructs the web browser 403 to display a web application screen while designating the URL of the expense management application 405 and the value "WS0001" of the web application ID 521 having been set for the pressed GUI button 815 (i.e., the button detected in the above-mentioned step S1208).

In step S1210, if the above-mentioned instruction has been received, the web browser 403 accesses the URL of the expense management application 405 and transmits value "WS0001" of the web application ID 521 as a parameter. Further, the web browser 403 requests the display of the web application screen.

In step S1211, the expense information management system performs matter management server authentication processing according to the request in the above-mentioned step S1210, as described in detail below with reference to illustrated in FIG. 13. The matter management server authentication processing includes acquiring and storing authentication information about the matter management server 130 (the matter management server authentication token 515) corresponding to the login device user in the above-mentioned step S1201, if the authentication information is not yet acquired by the expense management application 405, as described in detail below (see FIG. 13).

If the matter management server authentication processing in the above-mentioned step S1211 has been completed, the operation proceeds to loop processing of steps S1212 to S1221.

First, in step S1212, the expense management application 405 determines whether the user has succeeded in the web application login processing. Then, if the expense management application 405 determines that the web application login processing is not yet successfully completed, the operation proceeds to step S1213.

In step S1213, the expense management application 405 refers to the web application information 520 based on the value "WS0001" of the web application ID 521 received from the web browser 403 in the above-mentioned step S1210 and acquires the web application login URL 523. In the present exemplary embodiment, it is assumed that the expense management application 405 acquires "http://www.webserver1.aaa.bbb/login.html". Further, the expense management application 405 transmits a request of the web application login screen 1100 illustrated in FIG. 11A to the web server 120 with reference to the acquired URL.

If the request of the above-mentioned web application login screen 1100 has been received, the UI application 411 of the web server 120 generates HTML of the web application login screen 1100 corresponding to the URL included in the above-mentioned request. Then, in step S1214, the UI application 411 returns a response including the generated web application login screen 1100 to the MFP 110, via the HTTP communication unit 413.

In step S1215, if the above-mentioned web application login screen 1100 has been received, the expense management application 405 transmits the received web application login screen 1100 to the web browser 403.

In step S1216, if the above-mentioned web application login screen 1100 has been received, the web browser 403 causes the operation unit 210 of the MFP 110 to display the received web application login screen 1100, for example, as illustrated in FIG. 11A.

Next, in step S1217, if the user enters a web application user ID and a web application password on the web application login screen 1100 and then presses the OK button 1103, the web browser 403 starts the following web application login processing.

First, in step S1218, the web browser 403 transmits the information (i.e., the web application user ID and the web application password) entered in the web application user ID input area 1101 and the web application password input area 1102 to the URL of the expense management application 405.

In step S1219, if the above-mentioned information has been received, the expense management application 405 transmits the received web application user ID and the web application password to the web server 120.

In step S1220, if the above-mentioned web application user ID and the web application password have been received, the UI application 411 of the web server 120 performs web server authentication processing with reference to the received web application user ID and the web application password. Further, in step S1221, the UI application 411 of the web server 120 returns a response including an authentication result to the expense management application 405. If the web application login processing has been successfully completed, the UI application 411 of the web server 120 generates HTML of the web application menu screen 1110 illustrated in FIG. 11B and returns a response including the generated HTML, as a web server authentication result, to the MFP 110 via the HTTP communication unit 413. On the other hand, if the web application login processing has been failed, the UI application 411 returns a response including login failure information as a web server authentication result, although not illustrated.

If the expense management application 405 receives the response including the above-mentioned web server authentication result, the operation proceeds to the above-mentioned step S1212. Then, if it is determined that the web application login processing has been failed in the above-mentioned step S1212, the expense management application 405 performs the processing again in steps S1212 to S1221. On the other hand, if it is determined that the web application login processing has been successfully completed, the expense management application 405 terminates the loop processing. Then, the operation proceeds to step S1222.

In step S1222, the expense management application 405 stores data "login" in the category 532 field of the expense management log 530. The expense management application 405 further stores login time "2014/10/23 16:53:0023" in the details 534 field.

Next, in step S1223, the expense information management system performs matter information setting processing as described in detail below with reference to FIG. 14. The matter information setting processing includes prompting the user to set an expense information registration target matter and storing information about the registration target matter in the expense management log, as described in detail below (see FIG. 14).

Next, in step S1224, the expense management application 405 returns a response including the web application menu screen 1110 illustrated in FIG. 11B received from the web server 120 in the above-mentioned step S1221, to the web browser 403.

In step S1225, if the above-mentioned web application menu screen 1110 illustrated in FIG. 11B has been received, the web browser 403 causes the operation unit 210 of the MFP 110 to display the received web application menu screen 1110.

As mentioned above, the expense information management system performs sequential processing, including the matter management server authentication processing to be performed as initial setting after a user starts operating the MFP 110 and processing for logging in the web server 120.

<Matter Management Server Authentication Processing>

Next, the matter management server authentication processing to be performed in step S1211 of FIG. 12 will be described in detail below with reference to FIG. 13. FIG. 13 is a sequence diagram illustrating the matter management server authentication processing according to the first exemplary embodiment. In the present exemplary embodiment, a sequential processing procedure including authentication processing relating to the matter management server 130 to be performed in a case where the authentication information about the matter management server 130 is not yet acquired by the login device user will be described in detail below. The expense information management system performs the sequence illustrated in FIG. 13 when the expense management application 405 has received the web application screen display request in step S1210 illustrated in FIG. 12.

First, in step S1301, the expense management application 405 requests the login application 401 to transmit the device user information 500 about a device login user currently logging in the MFP 110.

In step S1302, if the above-mentioned request has been received, the login application 401 acquires the requested device user information 500 stored in the MFP 110 and transmits the acquired information to the expense management application 405.

In step S1303, if the above-mentioned device user information 500 has been received, the expense management application 405 confirms whether the matter management server authentication information 510 corresponding to the device user ID 511 included in the above-mentioned device user information 500 is present under the management of the expense management application 405. Then, the operation proceeds to optional processing illustrated in steps S1304 to S1315.

First, in step S1304, the expense management application 405 determines whether the matter management server authentication information corresponding to the device user ID 511 is not present in the confirmation processing in the above-mentioned step S1303. Then, if the presence of the corresponding matter management server authentication information has been confirmed, the expense management application 405 terminates the sequential processing illustrated in FIG. 13.

On the other hand, if the presence of the corresponding matter management server authentication information has not been confirmed, the expense management application 405 performs the following processing in steps S1305 to S1315.

In step S1305, the expense management application 405 requests the matter management server 130 to transmit the matter management server login screen 900 illustrated in FIG. 9. If the above-mentioned request has been received, the matter management server 130 performs loop processing in steps S1306 to S1314.

First, in step S1304, the user management application 424 of the matter management server 130 determines whether the matter management server login processing has been successfully completed for the matter management server user ID 514 corresponding to the device user ID 511. Then, if the user management application 424 determines that the matter management server login processing is not yet successfully completed, the operation proceeds to step S1307.

In step S1307, the UI application 421 of the matter management server 130 generates HTML of the matter management server login screen 900 (see FIG. 9), which corresponds to the URL received from the MFP 110. Then, the UI application 421 returns a response including the matter management server login screen 900 to the MFP 110 via the HTTP communication unit 423.

In step S1308, if the matter management server login screen 900 has been received, the expense management application 405 transmits the received matter management server login screen 900 to the web browser 403.

In step S1309, if the above-mentioned matter management server login screen 900 has been received, the web browser 403 causes the operation unit 210 of the MFP 110 to display the received matter management server login screen 900.

In step S1310, if the user enters a matter management server user ID and a matter management server password on the matter management server login screen 900 and then presses the OK button 903, the web browser 403 starts the following matter management server login processing.

First, in step S1311, the web browser 403 transmits the information (i.e., the matter management server user ID and the matter management server password) entered in the matter management server user ID input area 901 and the matter management server password input area 902, to the URL of the expense management application 405.

In step S1312, if the above-mentioned information is received, the expense management application 405 transmits the received matter management server user ID and the matter management server password to the matter management server 130.

In step S1313, if the above-mentioned matter management server user ID and the matter management server password have been received, the user management application 424 of the matter management server 130 performs authentication processing with reference to the received matter management server user ID and the matter management server password. The user management application 424 performs the authentication processing by comparing the received matter management server user ID and the matter management server password with the matter management server user ID 601 and the matter management server password 602 included in the matter management server user information 600.

Next, in step S1314, the user management application 424 returns a response including a result of the matter management server authentication processing in the step S1313 to the MFP 110. If the matter management server authentication processing has been successfully completed and the matter management server login processing has been successfully completed, the user management application 424 returns a response including a matter management server authentication token, as a matter management server authentication result, to the MFP 110. On the other hand, if the matter management server authentication processing has been failed, the user management application 424 returns a response including information informing failure in the matter management server authentication processing, as a matter management server authentication result, to the MFP 110. If the user management application 424 completes the returning of the response including the above-mentioned matter management server authentication result, the operation proceeds to the above-mentioned step S1306, again.

Then, in the above-mentioned step S1306, if it is determined that the matter management server login processing has been failed, the user management application 424 performs the processing in steps S1307 to S1314 again. On the other hand, if it is determined that the matter management server login processing has been successfully completed, the user management application 424 terminates the loop processing. Then, the operation proceeds to step S1315.

In step S1315, the expense management application 405 performs the following matter management server authentication information storing processing to store the matter management server authentication token (i.e., the matter management server authentication result) transmitted and received in the above-mentioned step S1314.

First, the expense management application 405 associates the device user ID 501 received in the above-mentioned step S1302 with the above-mentioned received authentication token (i.e., the matter management server authentication token 515), and stores the associated information in the above-mentioned list of the matter management server authentication information 510. If the matter management server authentication information storing processing in the above-mentioned step S1315 has been completed, the expense management application 405 terminates the sequential processing illustrated in FIG. 13.

As mentioned above, in a case where authentication information of the matter management server 130 corresponding to a login device user has not been acquired by the expense management application 405, the expense information management system performs the sequential processing (i.e., the matter management server authentication processing in step S1211 in FIG. 12) until the above-mentioned authentication information can be acquired.

<Matter Information Setting Processing>

Next, the matter information setting processing (see step S1223 in FIG. 12) will be described in detail below with reference to FIG. 14.

FIG. 14 is a sequence diagram illustrating the matter information setting processing. Hereinbelow, a sequential processing procedure, which includes processing for prompting a user to set (select) an expense information setting target matter and processing for storing the above-mentioned setting target matter information in the expense management log 530 will be described in detail below.

First, in step S1401, the expense management application 405 requests the login application 401 to transmit the device user information 500 about a device login user presently logging in the MFP 110.

In step S1402, if the above-mentioned request has been received, the login application 401 acquires the device user information 500 about the present login user, which is stored in the MFP 110, and transmits the acquired device user information 500 to the expense management application 405.

In step S1403, if the above-mentioned device user information 500 has been received, the expense management application 405 acquires the device user ID 501 from the received device user information 500 and then acquires the matter management server authentication information 510 corresponding to the above-mentioned device user ID 501.

Next, in step S1404, the expense management application 405 acquires the matter management server ID 512, the matter management server URL 513, the matter management server user ID 514, and the matter management server authentication token 515 from the matter management server authentication information 510 acquired in the above-mentioned step S1403. Further, the expense management application 405 transmits the acquired matter management server user ID 514 and the matter management server authentication token 515 to the matter management server 130 and requests the matter management server 130 to perform authentication processing.

In step S1405, if the above-mentioned authentication request has been received, the user management application 424 of the matter management server 130 performs authentication processing with reference to the matter management server user ID and the matter management server authentication token received from the MFP 110.

Next, in step S1406, the user management application 424 transmits an authentication result of the above-mentioned step S1405 to the MFP 110.

In step S1407, if the above-mentioned authentication result has been received, the expense management application 405 of the MFP 110 requests the matter management server 130 to acquire matter information relating to the above-mentioned matter management server ID 512, including the above-mentioned matter management server user ID 514.

In step S1408, if the above-mentioned acquisition request has been received, the matter management application 425 of the matter management server 130 acquires matter information, if the responsible user ID 613 corresponds to the received matter management server user ID, from the matter information 610. In the present exemplary embodiment, it is assumed that the matter management application 425 acquires data of "M0001", "M0002", and "M0003" in the matter ID 611 field if the matter management server user ID is "MU0001", according to the matter information 610 illustrated in FIG. 6.

Next, in step S1409, the matter management application 425 transmits the matter information acquired in the above-mentioned step S1408, to the MFP 110.

In step S1410, if the above-mentioned matter information has been received, the expense management application 405 generates HTML of the matter setting screen 1000 illustrated in FIG. 10 based on the matter information relating to the received matter management server user ID and transmits the generated matter setting screen 1000 to the web browser 403. In this case, it is assumed that a matter ID and a matter name (i.e., part of the matter information received in the above-mentioned step S1409) can be set as choices in the matter information selection area 1001 of the above-mentioned generated matter setting screen 1000.

In step S1411, if the above-mentioned matter setting screen 1000 has been received, the web browser 403 causes the operation unit 210 of the MFP 110 to display the received matter setting screen 1000.

Next, in step S1412, if the user selects a matter in the matter information selection area 1001 of the matter setting screen 1000 and presses the OK button 1002, the web browser 403 starts the following matter setting processing. In the present exemplary embodiment, it is assumed that the selected matter is matter "litigation A" corresponding to the matter ID "M0001".

First, in step S1413, the web browser 403 transmits matter information (matter ID) corresponding to the matter selected in the matter information selection area 1001 to the URL of the expense management application 405.

In step S1414, if the above-mentioned matter ID has been received, the expense management application 405 stores the received matter ID in the expense management log 530, while designating "matter information" in the category 532 field. In this case, it is assumed that the expense management application 405 stores a corresponding matter ID ("M0001" according to the above-mentioned example) in the details 534 field. If the processing in the above-mentioned step S1414 has been completed, the expense management application 405 terminates the processing of the flowchart illustrated in FIG. 14.

<Web Application Execution Processing>

Next, a sequential processing procedure that includes executing a web application after displaying the web application menu screen in the above-mentioned initial setting processing illustrated in FIG. 12, executing a job including MFP service provider processing, and logging out of the MFP, will be described in detail below with reference to FIG. 15. FIG. 15 is a sequence diagram illustrating web application execution processing according to the first exemplary embodiment.

If the web browser 403 causes the operation unit 210 of the MFP 110 to display the web application menu screen 1110 (see FIG. 11B) in step S1225 illustrated in FIG. 12, the expense information management system starts the processing illustrated in FIG. 15. In other words, the operation proceeds to loop processing steps S1501 to S1523.

In step S1501, if the user presses (selects) any one of the menu buttons 1112, 1113, and 1114 or the logout button 1111 on the web application menu screen 1110, the web browser 403 starts the following web application execution processing.

First, in step S1502, the web browser 403 transmits a request of the web application processing screen based on the information selected on the web application menu screen 1110, to the URL of the expense management application 405. The request transmitted in this case includes a parameter indicating the URL of the requested web application processing screen.

In step S1503, if the above-mentioned request has been received, the expense management application 405 confirms whether the URL of the web application processing screen received from the web browser 403 corresponds to the web application logout URL 524 of the web application information 520. The processing branches off into step S1504 or step S1522 according to the above-mentioned confirmation result.

The processing in step S1504 corresponds to the processing performed, if the expense management application 405 determines that the above-mentioned received URL of the web application processing screen is other than the above-mentioned web application logout URL (i.e., when the requested screen is not the logout screen), and the expense information management system perform processing in steps S1505 to S1521.

On the other hand, the processing in step S1522 corresponds to the processing performed, if the expense management application 405 determines that the above-mentioned received URL of the web application processing screen is the above-mentioned web application logout URL (i.e., when the requested screen is the logout screen), and the expense information management system performs processing in step S1523.

First, the processing to be performed when the requested screen is not the logout screen (i.e., the processing to be performed in step S1504) will be described in detail below.

First, in step S1505, the expense management application 405 transmits a web application processing screen request including the URL of the above-mentioned received web application processing screen (i.e., information about the screen requested through the selection input on the web application menu screen), to the web server 120.

In step S1506, if the above-mentioned request has been received, the UI application 411 of the web server 120 generates HTML of web application processing screen (see web application processing screen 1120 illustrated in FIG. 11C) according to the content of the received URL of the web application processing screen and returns a response including the generated HTML to the MFP 110 via the HTTP communication unit 423.

In step S1507, if the above-mentioned HTML of the web application processing screen has been received, the expense management application 405 returns a response including the received HTML of the web application processing screen, to the web browser 403.

In step S1508, if the above-mentioned HTML of the web application processing screen has been received, the web browser 403 causes the operation unit 210 of the MFP 110 to display the screen (see web application processing screen 1120 illustrated in see FIG. 11C) based on the received HTML of the web application processing screen.

Next, in step S1509, if the user selects the document selection input box 1122 or 1123 on the web application processing screen 1120 and presses the OK button 1124, the web browser 403 starts the following web application job execution processing.

First, in step S1510, the web browser 403 transmits the information input via the web application processing screen 1120 to the URL of the expense management application 405 and requests transmission to the web server.

In step S1511, if the above-mentioned information has been received, the expense management application 405 transmits the received information input via the web application processing screen to the web server 120. Although not illustrated in the present sequence diagram, if the information received in the above-mentioned step S1510 when the logout button 1121 is pressed on the web application processing screen 1120 is the web application logout URL, it is assumed that the operation directly proceeds to step S1523.

In step S1512, if the above-mentioned information input via the web application processing screen has been received, the main control program 412 of the web server 120 performs job execution processing with reference to the information input via the received web application processing screen. In the present exemplary embodiment, it is assumed that the web application processing is a print of a document selected in the document selection input box 1122 or 1123 of the web application processing screen 1120. The main control program 412 acquires an intended document from the documents stored in the RAM 302 or the external memory 307, as the job execution processing. The document to be acquired in this case is a document corresponding to the content selected via the web application processing screen received in the above-mentioned step S1510. The main control program 412 transmits the acquired document to the MFP 110 and requests the MFP 110 to print the document (i.e., requests job input). The MFP 110 receives the above-mentioned document print request via the HTTP communication unit 404 and the expense management application 405 receives the print execution request.

In step S1513, if the above-mentioned document print request has been received, the expense management application 405 requests the service provider 406 to print the document corresponding to the received request (i.e., requests job input). The data transmitted to the service provider 406 in this case includes the device user ID.

In step S1514, if the above-mentioned document print request has been received, the service provider 406 prints the document corresponding to the received request (i.e., performs job processing).

Next, in step S1515, the service provider 406 outputs a print result of the above-mentioned document to the parameter log 700 illustrated in FIG. 7. For example, the service provider 406 outputs the information corresponding to the sequential tags 701 to 712 illustrated in FIG. 7. The device user ID received in the above-mentioned step S1513 is output to the requestUserName tag 701 of the parameter log 700.

Next, in step S1516, the service provider 406 transmits a job input result including a job number to the expense management application 405.

In step S1517, if the above-mentioned job number has been received, the expense management application 405 stores the received job number in the expense management log 530 while designating "job" in the category 532 field. The data to be stored in the details 534 field in this case is the job number (e.g., "100").

Next, in step S1518, the expense management application 405 returns a response including a job execution result to the web server 120.

In step S1519, if the above-mentioned job result has been received, the UI application 411 of the web server 120 generates HTML of the web application menu screen 1110 (see FIG. 11B), as a processing result screen corresponding to the web application processing screen 1120 (see FIG. 11C). Then, the UI application 411 returns a response including the web application menu screen 1110 to the MFP 110 via the HTTP communication unit 413.

In step S1520, if the above-mentioned HTML of the web application menu screen 1110 has been received, the expense management application 405 returns a response including the received HTML of the web application menu screen 1110 to the web browser 403.

In step S1521, if the above-mentioned HTML of the web application menu screen 1110 has been received, the web browser 403 causes the operation unit 210 of the MFP 110 to display the web application menu screen 1110 (see FIG. 11B) based on the received HTML of the web application menu screen 1110. Then, the web browser 403 terminates the present branch processing. The operation proceeds to step S1501 again.

Next, the processing to be performed when the requested screen is the logout screen (i.e., the processing to be performed in step S1522) will be described in detail below.

In step S1523, the expense management application 405 terminates the present loop processing (steps S1501 to S1523). Then, the operation proceeds to step S1524.

In step S1524, the expense management application 405 requests the web server 120 to perform logout processing corresponding to the logout button 1111 illustrated in FIG. 11B or the logout button 1121 illustrated in FIG. 11C.

In step S1525, if the above-mentioned request has been received, the UI application 411 of the web server 120 performs logout processing and generates HTML of a web application logout screen that can display a result of the logout processing. Then, the UI application 411 returns a response including the generated HTML to the MFP 110 via the HTTP communication unit 413. In the present exemplary embodiment, it is assumed that the web application login screen 1100 illustrated in FIG. 11A is used as the web application logout screen.

In step S1526, if the above-mentioned HTML of the web application logout screen has been received, the expense management application 405 stores the received data in the expense management log 530 while designating "logout" in the category 532 field. The expense management application 405 further stores logout time "2014/10/23 17:08:0012" in the details 534 field.

Next, in step S1527, the expense management application 405 returns a response including the HTML of the web application logout screen received in the above-mentioned step S1525 to the web browser 403.

In step S1528, if the above-mentioned HTML has been received, the web browser 403 causes the operation unit 210 of the MFP 110 to display the web application logout screen based on the received HTML.

As mentioned above, the expense information management system performs sequential processing that includes executing a web application after displaying the web application menu screen in the initial setting processing illustrated in the FIG. 12, executing a job including MFP service provider processing, and logging out of the MFP.

<Expense Information Registration Processing>

Next, a sequential processing procedure (expense information registration processing), which includes processing to be performed by the MFP 110 to register expense information to the matter management server 130 after the web application processing illustrated in FIG. 15 has been terminated, will be described in detail below with reference to FIG. 16.

Figure 16:
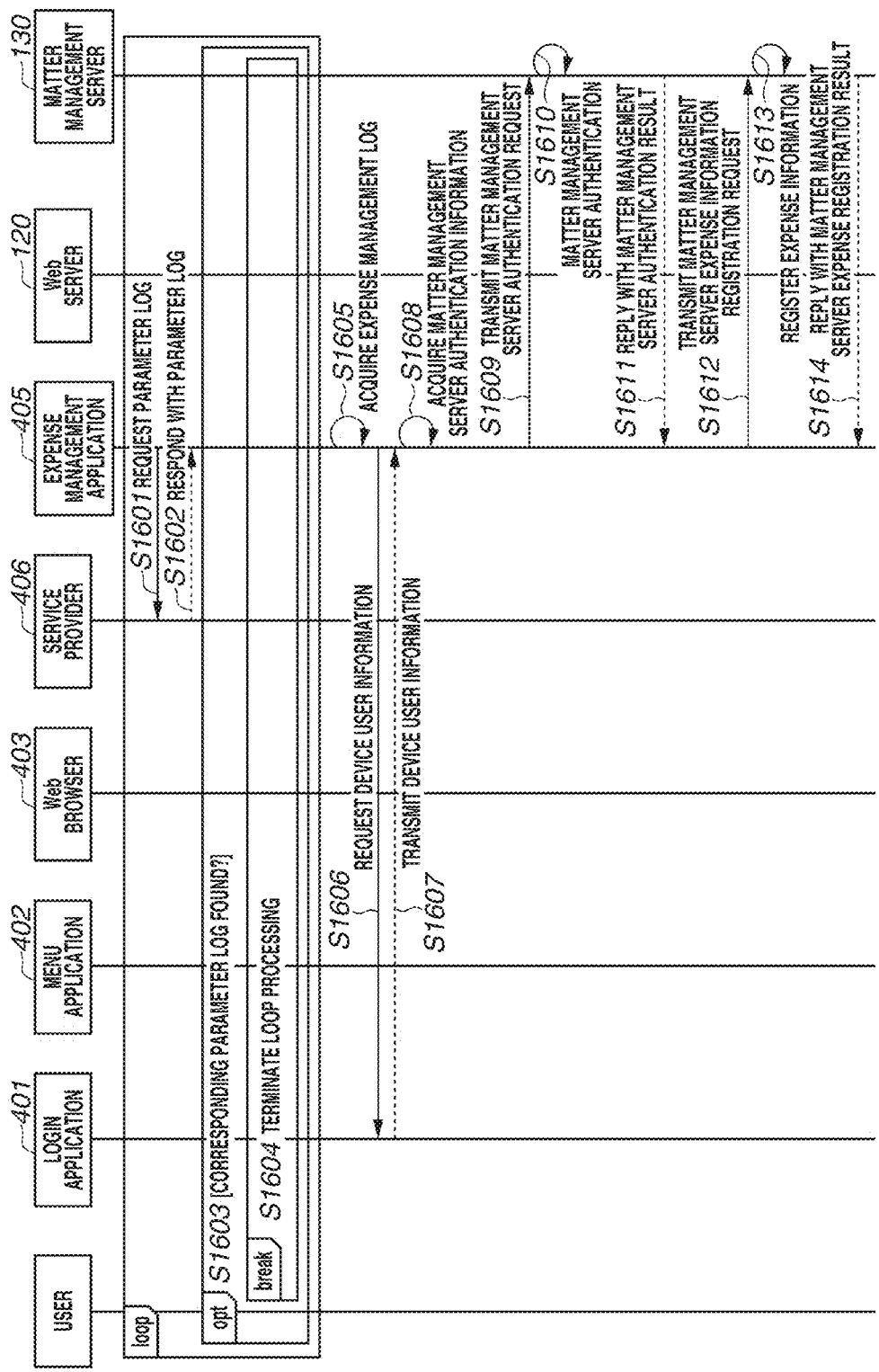
FIG. 16 is a sequence diagram illustrating expense registration processing.

FIG. 16 is a sequence diagram illustrating expense registration processing according to the first exemplary embodiment.

In step S1526 illustrated in FIG. 15, if the expense management application 405 completes the storage of the data in the expense management log 530 while designating "logout" in the category 532 field, the expense information management system starts the processing illustrated in FIG. 16. After the processing illustrated in FIG. 16 has been started, the expense information management system repetitively performs loop processing in steps S1601 to S1604 until the system terminates the processing in step S1604.

First, in step S1601, the expense management application 405 requests the service provider 406 to acquire the parameter log 700 held by the service provider 406. In this case, the expense management application 405 transmits the device user ID used when the job execution is instructed to the service provider 406 in step S1513 of the web application execution processing illustrated in FIG. 15 to the service provider 406. Then, the expense management application 405 requests the service provider 406 to acquire a not-yet-acquired parameter log 700 relating to the above-mentioned device user ID.

In step S1602, if the above-mentioned request has been received, the service provider 406 returns a response including the parameter log 700 relating to the device user ID included in the received request, which is held by the service provider 406 and is not yet transmitted to the expense management application 405, to the expense management application 405. If there is not any required device user ID related parameter log 700 that is not yet transmitted, the service provider 406 returns a response informing the absence of the requested parameter log 700. In this case, it is assumed that the service provider 406 can discriminate a parameter log not yet transmitted to the expense management application 405 from a parameter log having been already transmitted.

If the above-mentioned response has been received, the expense management application 405 performs optional processing illustrated in step S1603.

In the optional processing, the expense management application 405 determines whether the parameter log relating to the device user ID has been acquired in the above-mentioned step S1602. Then, if it is determined that the parameter log relating to the device user ID has not been acquired, the operation proceeds to the processing in step S1601 again.

On the other hand, if it is determined that the parameter log relating to the device user ID has been acquired in the above-mentioned step S1602, then in step S1604, the expense management application 405 terminates the present loop processing. Then, the operation proceeds to step S1605.

In step S1605, the expense management application 405 acquires the expense management log 530. In this case, the expense management application 405 acquires the expense management log 530 relating to the device user ID used when the job execution is instructed to the service provider 406 in step S1513 illustrated in FIG. 15. In this case, the expense management application 405 acquires logs corresponding to the device user ID, covering the latest login to the latest logout.

Next, in step S1606, the expense management application 405 requests the login application 401 to transmit the device user information 500 corresponding to the device user ID used when the job execution is instructed to the service provider 406 in step S1513 illustrated in FIG. 15.

In step S1607, if the above-mentioned request has been received, the login application 401 acquires the device user information 500 stored in the MFP 110, which corresponds to the device user ID included in the above-mentioned request. Then, the login application 401 transmits the acquired device user information 500 to the expense management application 405. The expense management application 405 receives the device user information 500. Therefore, the expense management application 405 can confirm the presence of the user information about the user corresponding to the parameter log received in the above-mentioned steps S1601 to S1604, at this moment.

In step S1608, if the above-mentioned device user information 500 has been received, the expense management application 405 acquires the device user ID 501 and the device user password 502 from the received device user information 500. Then, the expense management application 405 acquires the matter management server authentication information 510 corresponding to the above-mentioned device user ID 501 with reference to the acquired information. In the present exemplary embodiment, the matter management server authentication information 510 is stored in a secure region of the device because the matter management server authentication token 515 used by the matter management server 130 is included. Authentication based on the device user password 502 included in the device user information 500 is necessary for the matter management server authentication information 510.

Next, in step S1609, the expense management application 405 acquires the matter management server ID 512, the matter management server URL 513, and the matter management server authentication token 515 from the matter management server authentication information 510 acquired in the above-mentioned step S1608. Further, the expense management application 405 transmits the acquired information (i.e., the matter management server ID 512 and the matter management server authentication token 515) to the matter management server 130 and requests the matter management server 130 to perform authentication processing.

In step S1610, if the above-mentioned authentication request has been received, the user management application 424 of the matter management server 130 performs matter management server authentication processing with reference to the matter management server ID 512 and the matter management server authentication token 515 included in the above-mentioned request. Then, in step S1611, the user management application 424 transmits a matter management server authentication result to the MFP 110.

If the above-mentioned matter management server authentication result has been received, the expense management application 405 acquires job information with reference to the expense management log 530 acquired in the above-mentioned step S1605 and the parameter log 700 acquired in the above-mentioned step S1602. In the present exemplary embodiment, the expense management application 405 acquires matter ID (e.g., "M001") and job number (e.g., "100" or "101") of an expense information registration target with reference to the expense management log 530. Further, the expense management application 405 refers to the parameter log 700 and acquires job name from the jobName tag 702 relating to the job number acquired from the expense management log 530 and the total number of pages from the totalPageCount tag 703, as job information. Then, in step S1612, the expense management application 405 transmits expense information including the acquired matter ID and the job information to the matter management server 130 via the HTTP communication unit 423. In the present exemplary embodiment, the expense information is defined by the total number of pages (i.e., the data in the unit-of-expense 625 field is "page"). Alternatively, the expense information can be defined by the amount of money (i.e., the data in the unit-of-expense 625 field is "yen") as described in detail below in a fourth exemplary embodiment. Further, the expense information can be defined by the time (i.e., the data in the unit-of-expense 625 field is "minute") as described in detail below in a fifth exemplary embodiment.

In step S1613, if the above-mentioned matter ID and the job information have been received, the expense management application 426 of the matter management server 130 registers the received job information in association with the received matter ID in the expense information 620.

Next, in step S1614, the expense management application 426 transmits an expense registration result to the MFP 110 via the HTTP communication unit 423. The expense management application 405 receives the expense registration result. According to the above-mentioned configuration, the expense information can be registered to the matter management server 130 as illustrated, for example, in the first line or the second line of FIG. 6.

As mentioned above, in the first exemplary embodiment, the expense management application 405 intervenes between the web browser 403 and the web server 120 or between the web server 120 and the service provider 406 in the HTTP communications to acquire job information from the parameter log of the service provider 406. Therefore, even in a case where the web browser 403 of the image processing apparatus performs processing of sequential web applications in cooperation with the web server 120, it is feasible to simply register the expense relating to the sequential processing to the matter management server 130 without changing the existing web application system and the matter management server 130 and without forcing the user to perform a complicated operation. Further, because it is unnecessary to change the existing web browser 403 and the service provider 406, the effects of the present exemplary embodiment can be obtained even in a case where the MFP is a legacy device.

The expense information management system configured to display the matter setting screen when shifting into the web application menu screen (e.g., FIG. 11B) has been described in the above-mentioned first exemplary embodiment. However, performing the matter setting at different timing may be desired in other cases. In a second exemplary embodiment, processing for displaying the matter setting screen when shifting into a predetermined screen (e.g., a screen corresponding to URL having been set in the matter setting screen display URL 542 field of the matter setting screen information 540) will be described. Unless otherwise mentioned, if the reference number is the same, a block, a sequence, or processing according to the present exemplary embodiment is the same as the corresponding block, the sequence, or the processing described in the first exemplary embodiment.

Figure 17C:
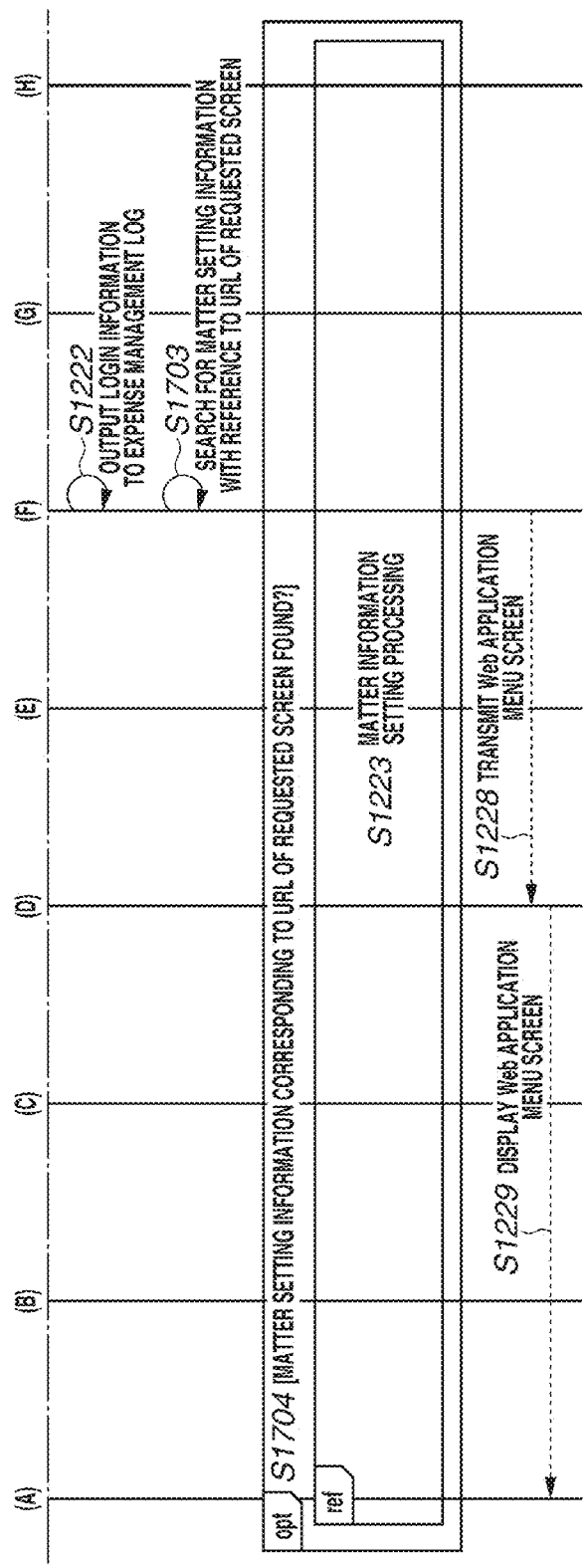
FIG. 17 (consisting of FIGS. 17A, 17B, and 17C) is a sequence diagram illustrating initial setting processing according to a second exemplary embodiment.
Figure 18B:
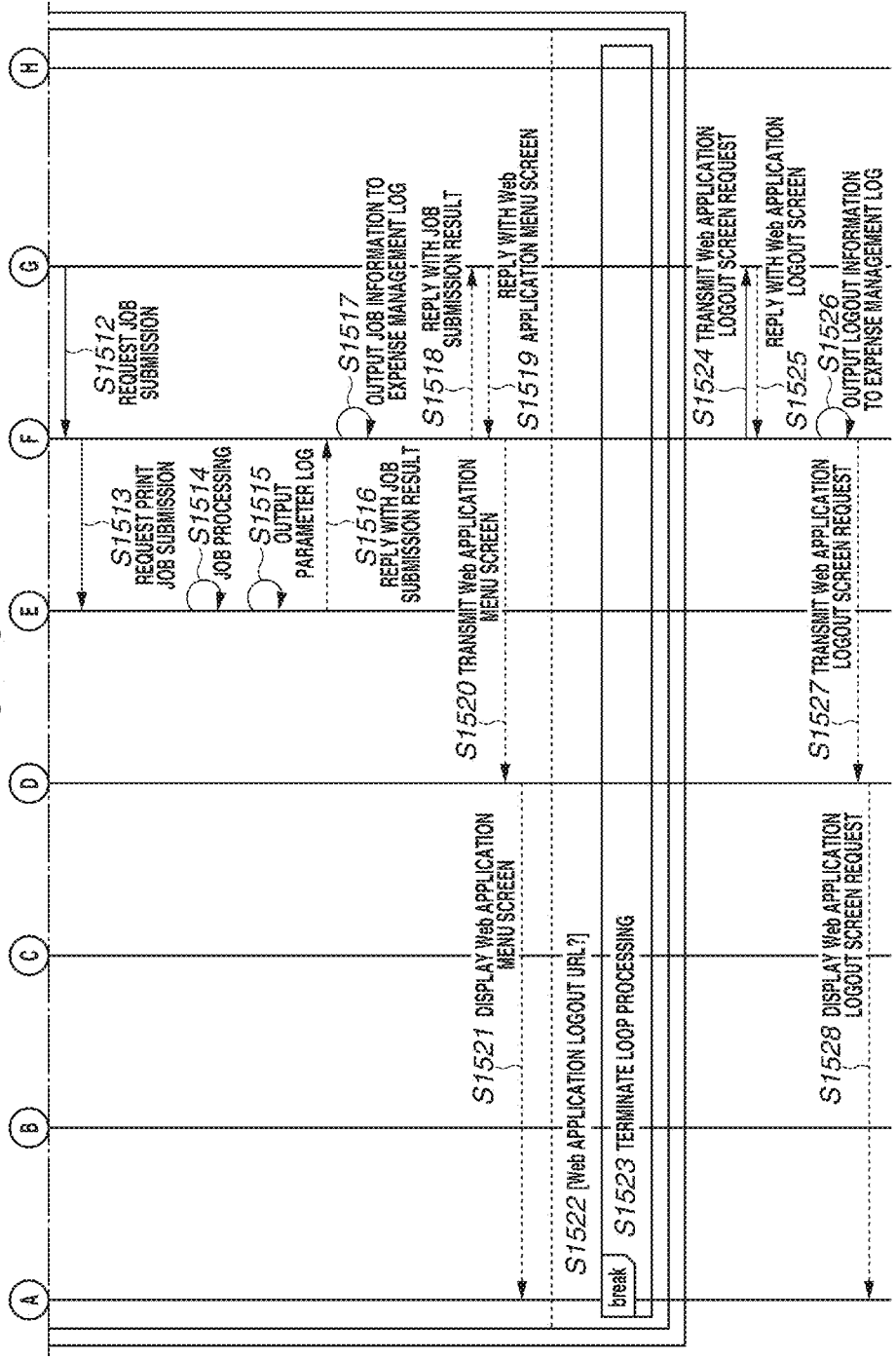
FIG. 18 (consisting of FIGS. 18A and 18B) is a sequence diagram illustrating web application execution processing according to the second exemplary embodiment.

FIGS. 17 and 18 illustrate sequential processing that can be performed by the software components of the MFP 110, the web server 120, and the matter management server 130 according to the second exemplary embodiment. In FIGS. 17 and 18, the processing to be performed by the MFP 110 can be realized by the CPU 201 of the MFP 110 by reading and executing the programs stored in the HDD 205. Further, the processing to be performed by the web server 120 can be realized by the CPU 301 of the web server 120 by reading and executing the programs stored in the external memory 307. Further, the processing to be performed by the matter management server 130 can be realized by the CPU 301 of the matter management server 130 by reading and executing the programs stored in the external memory 307.

<Initial Setting Processing>

First, a sequence of initial setting processing for displaying a dedicated matter setting screen when shifting into each web application screen, as processing to be performed instead of the processing illustrated in FIG. 12, will be described in detail below with reference to FIG. 17 (consisting of FIGS. 17A, 17B, and 17C).

FIG. 17 is a sequence diagram illustrating the initial setting processing according to the second exemplary embodiment, in which the step numbers used in FIG. 12 are allocated to the same steps, respectively.

In the second exemplary embodiment, after the matter management server authentication processing has been completed in step S1211, the expense management application 405 performs processing in step S1701. In step S1701, the expense management application 405 searches for the data corresponding to the URL requested by the web browser 403 in step S1210 from the matter setting screen display URL 542 field of the matter setting screen information 540. If the processing in step S1701 has been completed, the operation proceeds to optional processing in step S1702.

In step S1702, the expense management application 405 determines whether the matter setting screen information 540 corresponding to the requested URL is present as a search result in the above-mentioned step S1701. Then, if it is determined that the corresponding URL is included in the matter setting screen information 540, then in step S1223, the expense management application 405 performs matter information setting processing. Then, the operation proceeds to step S1212.

On the other hand, in the above-mentioned step S1702, if the expense management application 405 determines that the corresponding URL is not included in the matter setting screen information 540, the operation directly proceeds to step S1212.

Further, after completing the matter management server authentication processing in step S1222, the expense management application 405 performs processing in step S1703. In step S1703, the expense management application 405 searches for the data corresponding to the URL requested by the web browser 403 in step S1210 from the matter setting screen display URL 542 field of the matter setting screen information 540. If the processing in step S1703 has been completed, the operation proceeds to optional processing in step S1704. In the present exemplary embodiment, the expense information management system is configured to search for the URL of the screen requested by the web browser 403 from the matter setting screen display URL 542 field of the matter setting screen information 540. Alternatively, the expense information management system can be configured to search for a URL of a screen next displayed by the web browser 403 (i.e., a URL of a screen received by the expense management application 405 that mediates the transmission from the web server 120 to the web browser 403) from the matter setting screen display URL 542 field of the matter setting screen information 540.

In step S1704, the expense management application 405 determines whether the corresponding matter setting screen information 540 is present, as a search result in the above-mentioned step S1703. Then, if it is determined that the corresponding URL is included in the matter setting screen information 540, then in step S1223, the expense management application 405 performs matter information setting processing. Then, the operation proceeds to step S1228.

On the other hand, in the above-mentioned step S1704, if the expense management application 405 determines that the corresponding URL is not included in the matter setting screen information 540, the operation directly proceeds to step S1228. The rest of the processing is similar to that described in the first exemplary embodiment and therefore redundant description thereof will be avoided.

<Web Application Processing>

Next, a procedure of processing to be performed instead of the processing illustrated in FIG. 15 will be described in detail below with reference to FIG. 18.

FIG. 18 is a sequence diagram illustrating web application execution processing according to the second exemplary embodiment, in which the step numbers used in FIG. 15 are allocated to the same steps, respectively.

In the second exemplary embodiment, if the web application processing screen request has been received from the web browser 403 in step S1502, the expense management application 405 performs processing in step S1505. Then, in step S1506, if the web application processing screen returned from the web server 120 has been received, the expense management application 405 performs processing in step S1801.

In step S1801, the expense management application 405 searches for the data corresponding to the URL requested by the web browser 403 in step S1502 from the matter setting screen display URL 542 field of the matter setting screen information 540. If the processing in step S1801 has been completed, the processing branches off into step S1504 or step S1522.

Processing to be performed in step S1504 according to the second exemplary embodiment will be described in detail below.

In the second exemplary embodiment, first, after the processing in step S1802 has been completed, the expense management application 405 performs processing in step S1507.

In step S1802, the expense management application 405 determines whether the matter setting screen information 540 corresponding to the URL requested in the above-mentioned step S1502 is present, as a search result in the above-mentioned step S1801. Then, if it is determined that the corresponding URL is included in the matter setting screen information 540, then in step S1223, the expense management application 405 performs matter information setting processing. Then, the operation proceeds to step S1507.

On the other hand, in the above-mentioned step S1802, if the expense management application 405 determines that the corresponding URL is not included in the matter setting screen information 540, the operation directly proceeds to step S1507.

The rest of the processing is similar to that described in the first exemplary embodiment and therefore redundant description thereof will be avoided.

If the matter setting has been performed repetitively in the matter information setting processing (step S1223) of step S1702, step S1704, and/or step S182, the latest matter setting becomes valid.

In a case where the print job includes repetitively performed processes of web server menu screen→matter setting on matter setting screen→print job execution on web application processing screen→web server menu screen→ matter setting on matter setting screen→print job execution on web application processing screen→ . . . , the matter can be set differently for each job.

In this case, when the expense management application 405 requests the matter management server 130 to perform expense information registration in step S1612 illustrated in FIG. 16, it is assumed that the expense management application 405 requests the matter management server 130 to register expense information while associating each job information with matter ID relating to each job. Alternatively, the expense management application 405 may request the matter management server 130 to register expense information for each matter ID.

As mentioned above, in the second exemplary embodiment, in a case where a URL of a screen to be displayed on the web browser 403 from the web server 120 is already set in the matter setting screen information 540, the expense management application 405 displays the matter setting screen, as an interruption screen, when shifting into the above-mentioned screen. By setting a URL of a screen (i.e., the cause of displaying a matter setting screen) in the matter setting screen information 540 as mentioned above, it is feasible to obtain an effect of allowing a user to perform matter setting at arbitrary timing to shift into the web application screen, in addition to the effects of the first exemplary embodiment.

In the above-mentioned second exemplary embodiment, the expense information management system displays the matter setting screen as another screen different from the web application screen. However, in a case where the matter setting processing is performed frequently, performing the matter setting processing with a dedicated screen different from the web application may be complicated. Therefore, in a third exemplary embodiment, processing for displaying a web application screen including a matter setting input field will be described. Unless otherwise mentioned, if the reference number is the same, a block, a sequence, or processing according to the present exemplary embodiment is the same as the corresponding block, the sequence, or the processing described in the second exemplary embodiment.

<Web Application HTML>

Hereinbelow, a comparison between the HTML of the web application screen generated by the UI application 411 of the web server 120 and the HTML of the screen generated by the expense management application 405 of the MFP 110 according to the third exemplary embodiment will be described in detail below with reference to FIG. 19.

FIG. 19 illustrates an HTML 1900 and an HTML 1910 of the web application screen.

In the present exemplary embodiment, the web application screen is the web application login screen 1100. The HTML illustrated in FIG. 19 does not include a description relating to the style sheet setting, which is not directly related to the present exemplary embodiment.

the HTML 1900 is an example of the HTML of the web application screen that can be generated by the UI application 411 of the web server 120. A form tag 1901 is an element usable to set form information to be transmitted to the web server. An input tag 1902 is an element usable to input a web application user ID to be transmitted to the web server. An input tag 1903 is an element usable to input a web application password to be transmitted to the web server. An input tag 1904 is an element usable to submit information input in the form tag 1901 to the web server 120.

The HTML 1910 is an example of the HTML that can be generated by the expense management application 405 of the MFP 110 according to the third exemplary embodiment. The HTML 1910 includes an element identical to that of the HTML 1900 and denoted by the same reference number.

A div tag 1911 is an element usable to divide the matter setting input portion. A select tag 1912 is an element representing the matter information selection area that allows a user to select an expense registration target matter. A plurality of option tags 1913, 1914, and 1915 are elements representing choices to be displayed in the select tag 1912.

The expense management application 405 according to the third exemplary embodiment generates the HTML 1910 by adding the div tag 1911, the select tag 1912, and the option tags 1913, 1914, and 1915 of the HTML 1910 in front of the input tag 1904 (submit) of the HTML 1900 received from the web server 120.

<Web Application Screen Including Matter Setting Input Field>

Figure 20:
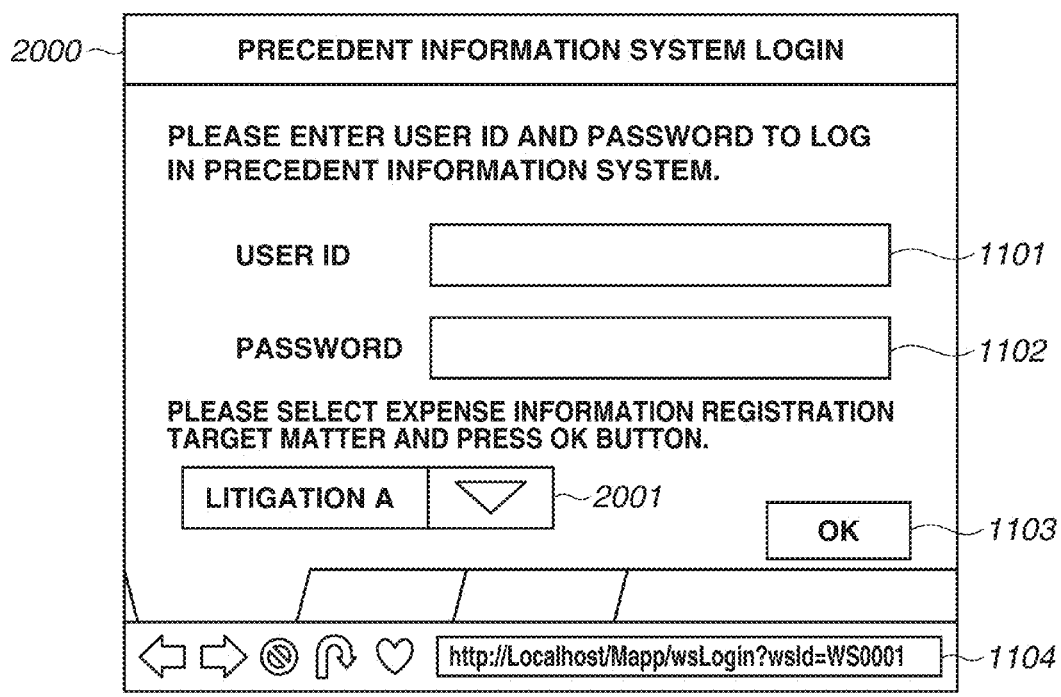
FIG. 20 is a diagram illustrating an example of a web application screen according to a third exemplary embodiment.

FIG. 20 illustrates a web application screen 2000 including a matter setting input field according to the third exemplary embodiment.

The web application login screen 2000 allows a user to log in a web application via the web browser 403 and, at the same time, perform a matter setting input operation. The web application login screen 2000 can be displayed by the web browser 403 based on the HTML 1910 illustrated in FIG. 19. The HTML 1910 can be acquired by adding the matter setting input content to the HTML 1900 acquired by the expense management application 405 from the web server 120.

The web application login screen 2000 includes a matter setting input field 2001 that allows a user to select an expense registration target matter in addition to the elements having been described with reference to FIG. 11.

Figure 21B:
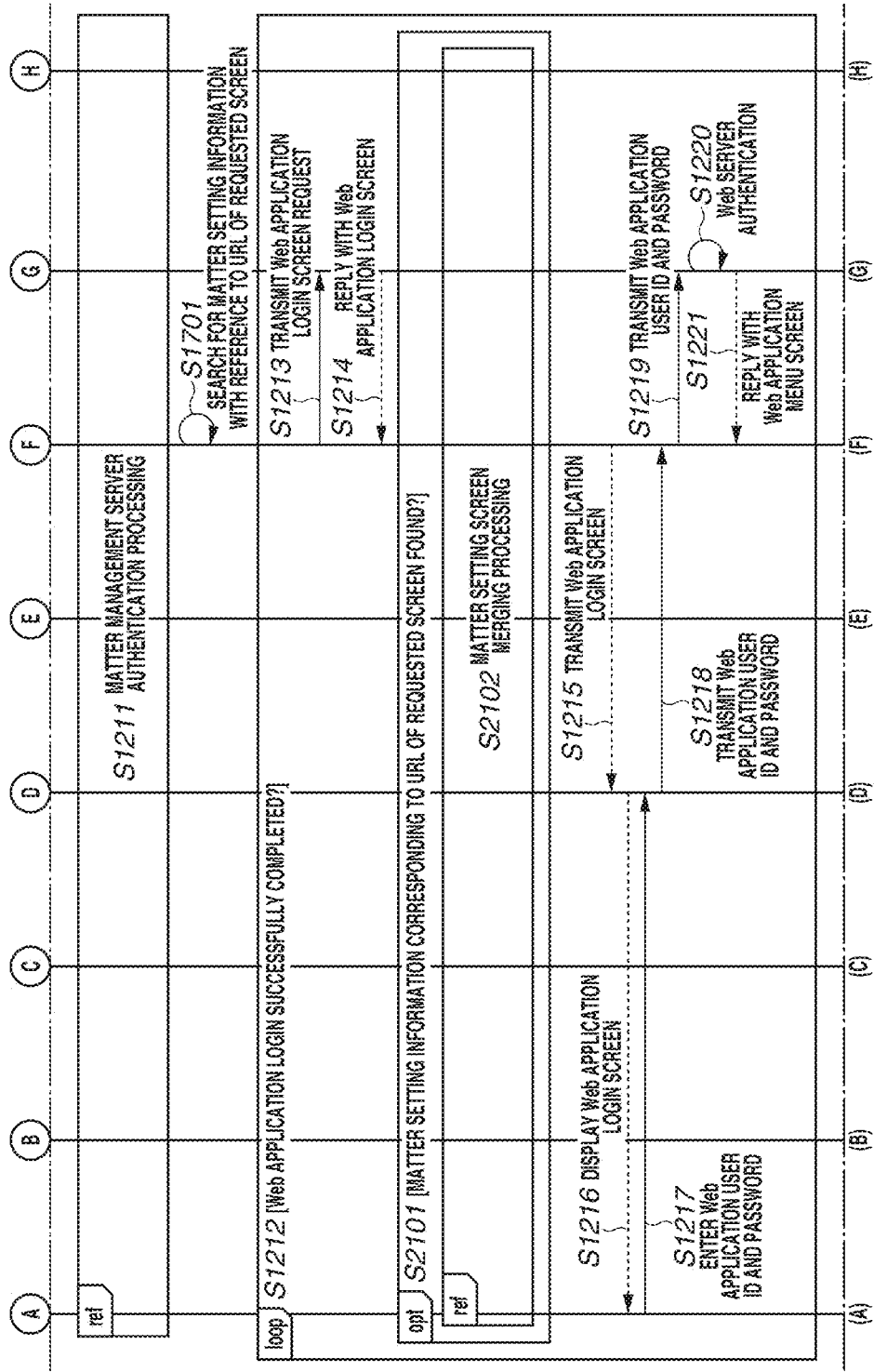
FIG. 21 (consisting of FIGS. 21A, 21B, and 21C) is a sequence diagram illustrating initial setting processing according to an exemplary embodiment of the present invention, in a case where merging display of the matter setting screen is performed.
Figure 21C:
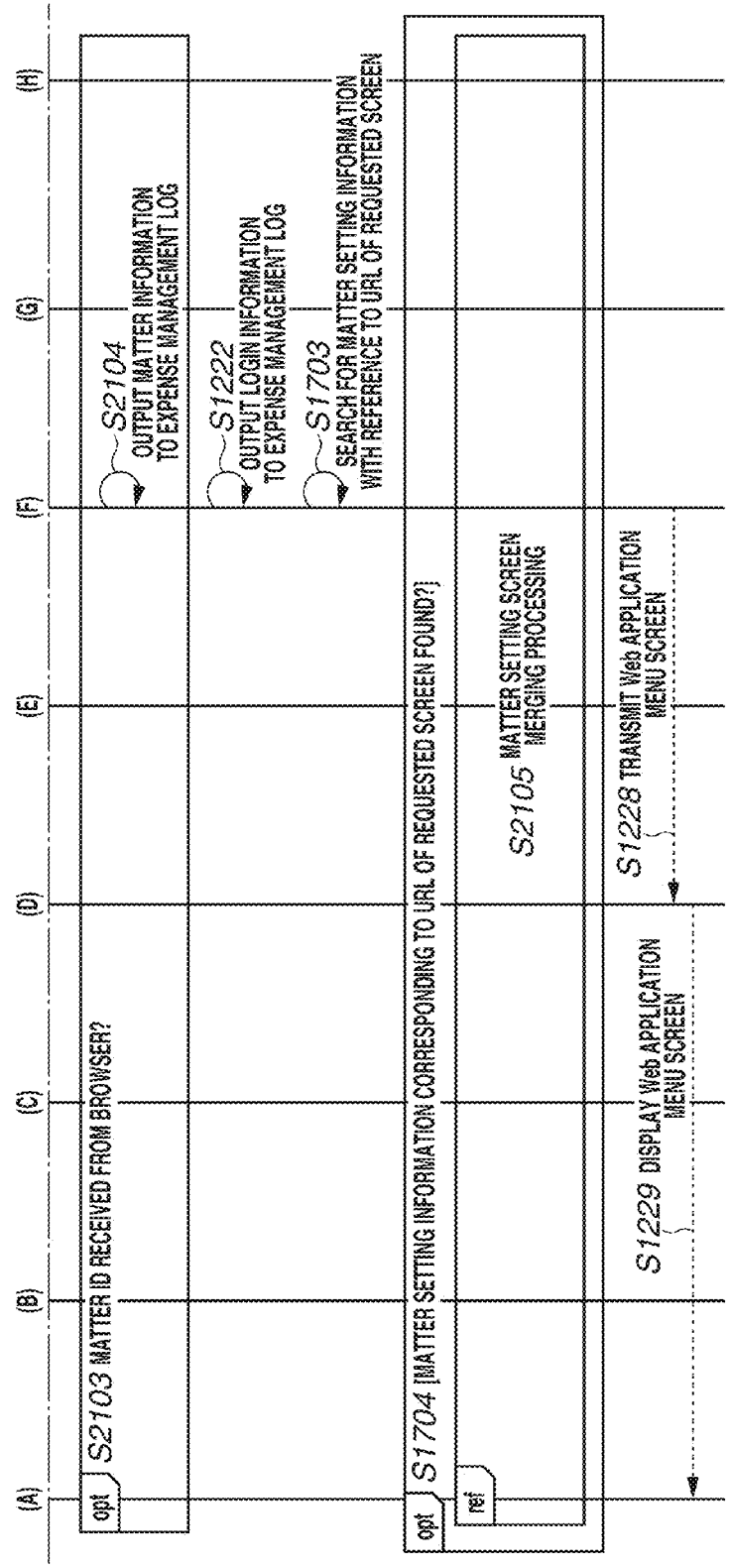
Figures 22, 22A, 22B:
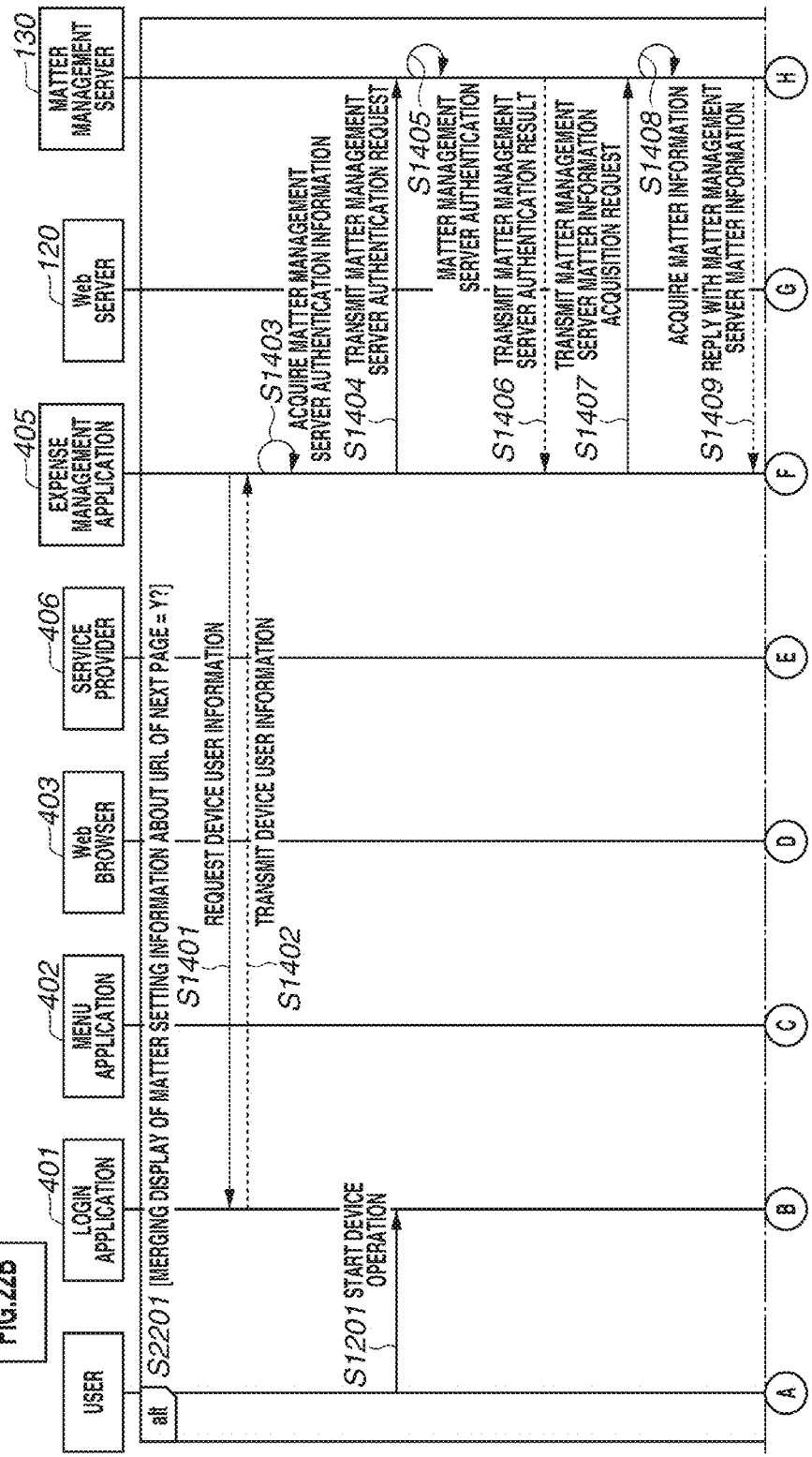
FIG. 22 (consisting of FIGS. 22A and 22B) is a sequence diagram illustrating matter setting screen merging processing.

FIG. 21 (consisting of FIGS. 22A, 22B, and 23C) to 23 (consisting of FIGS. 23A, and 23B) illustrate sequential processing that can be performed by the software components of the MFP 110, the web server 120, and the matter management server 130 according to the third exemplary embodiment. In FIGS. 21 to 23, the processing to be performed by the MFP 110 can be realized by the CPU 201 of the MFP 110 by reading and executing the programs stored in the HDD 205. Further, the processing to be performed by the web server 120 can be realized by the CPU 301 of the web server 120 by reading and executing the programs stored in the external memory 307. Further, the processing to be performed by the matter management server 130 can be realized by the CPU 301 of the matter management server 130 by reading and executing the programs stored in the external memory 307.

<Initial Setting Processing>

First, a sequence of initial setting processing for displaying a dedicated matter setting screen when shifting into each web application screen, as processing to be performed instead of the processing illustrated in FIG. 17, will be described in detail below with reference to FIG. 21.

FIG. 21 is a sequence diagram illustrating initial setting processing according to the third exemplary embodiment, in which the step numbers used in FIG. 17 are allocated to the same steps, respectively.

In the third exemplary embodiment, after the processing in step S1701 has been completed, the expense management application 405 performs loop processing in step S1212. Further, in the loop processing, if the web application login screen transmitted from the web server 120 in step S1214 has been received, the expense management application 405 performs processing in step S2101.

In step S2101, the expense management application 405 determines whether the corresponding matter setting screen information 540 is present, as a search result in the above-mentioned step S1701. Then, if it is determined that the corresponding URL is included in the matter setting screen information 540, then in step S2102, the expense management application 405 performs matter setting screen merging processing. In the matter setting screen merging processing to be performed in the above-mentioned step S2102, the expense management application 405 performs processing for merging the HTML of the matter setting input field with the HTML of the web application login screen received from the web server 120 in step S1214 (as described in detail below with reference to FIG. 22). If the processing in step S2102 has been completed, the operation proceeds to step S1215.

On the other hand, in the above-mentioned step S2101, if the expense management application 405 determines that the corresponding URL is not included in the matter setting screen information 540, the operation directly proceeds to step S1215.

Further, in the third exemplary embodiment, after the loop processing in step S1212 has been completed, the expense management application 405 performs optional processing in step S2103.

In the optional processing of step S2103, the expense management application 405 determines whether there is a matter ID included in form data entered by the user via the web application login screen transmitted from the web browser 403 in step S1218. Then, if it is determined that the matter ID is included in the form data, the expense management application 405 performs processing in step S2104. On the other hand, if it is determined that there is not any matter ID included in the form data, the expense management application 405 skips the processing in step S2104. Then, the operation directly proceeds to step S1222.

In step S2104, the expense management application 405 stores the matter ID received in the above-mentioned step S1218 while designating "matter information" in the category 532 field of the expense management log 530. In this case, the expense management application 405 stores a corresponding matter ID ("M0001") in the details 534 field. Then, if the expense management application 405 completes the processing in step S2104, the operation proceeds to step S1222.

Further, in the third exemplary embodiment, in step S1704, if it is determined that the corresponding URL is included in the matter setting screen information 540, the expense management application 405 performs matter setting screen merging processing in step S2105. Then, the operation proceeds to step S1228. The matter setting screen merging processing to be performed in step S2105 is similar to the processing in step S2102 and will be described in detail below with reference to FIG. 22.

<Matter Setting Screen Merging Processing>

Next, the above-mentioned matter setting screen merging processing to be performed in steps S2102 and S2105 illustrated in FIG. 21 and in below-described step S2301 illustrated in FIG. 23, as processing to be performed instead of the matter information setting processing illustrated in FIG. 14, will be described in detail below with reference to FIG. 22. In the present exemplary embodiment, a sequential processing procedure including merging a matter setting field with a web application screen, prompting a user to set (or select) an expense information setting target matter, and registering the determined matter information to the expense management log 530, will be described in detail below.

FIG. 22 is a sequence diagram illustrating the matter setting screen merging processing, in which the step numbers used in FIG. 14 are allocated to the same steps, respectively.

First, the expense management application 405 checks the matter setting screen information 540 corresponding to the URL of the next page and determines whether the data stored in the merging display 543 field is "Y" (indicating the decision to perform the merging display). The processing branches off into step S2201 or step S2209 according to a result of the above-mentioned determination. The URL of the next page is a URL of a screen to be next displayed by the web browser 403. More specifically, the URL of the next page corresponds to the URL determined by the calling source of the matter setting screen merging processing (e.g., step S2101 or step S1704 in FIG. 21, or later-described step S1802 illustrated in FIG. 23).

The expense information management system performs processing in step S2201 when the expense management application 405 determines that the data stored in the merging display 543 field of the matter setting screen information 540 corresponding to the URL of the next page is "Y" (indicating the decision to perform the merging display). The processing to be performed in step S2201 includes processing in steps S1401 to S1409 and steps S2202 to S2208.

On the other hand, the expense information management system performs processing in step S2209 when the expense management application 405 determines that the data stored in the merging display 543 field of the matter setting screen information 540 corresponding to the URL of the next page is "N" (indicating the decision not to perform the merging display). Then, the processing in step S2210 is performed.

First, the processing to be performed in step S2201 when the data stored in the merging display 543 field of the matter setting screen information 540 corresponding to the URL of the next page is "Y" (indicating the decision to perform the merging display), will be described in detail below.

First, redundant description of processing in step S2201 will be avoided with respect to steps S1401 to S1409. In the third exemplary embodiment, if the processing in step S1409 has been completed, the expense management application 405 performs processing in step S2202.

In step S2202, the expense management application 405 acquires HTML corresponding to the URL of the next page. In the present exemplary embodiment, it is assumed that the HTML acquired in step S2202 is the HTML 1900 illustrated in FIG. 19. Then, if the processing in step S2202 has been completed, the expense management application 405 performs loop processing in step S2203.

In step S2203, the expense management application 405 acquires the number of lines of the HTML 1900 and performs a control to repeat the processing in steps S2204 to S2207 for each of the first line to the last line of the HTML 1900.

In step S2204, the expense management application 405 acquires an unprocessed line from the HTML 1900 and performs optional processing in step S2205.

In the optional processing to be performed in step S2205, the expense management application 405 determines whether the HTML of the unprocessed line acquired in the above-mentioned step S2204 is an input tag and includes a submit attribute. Then, if it is determined that the HTML of the unprocessed line acquired in the above-mentioned step S2204 is the input tag and includes the submit attribute, the expense management application 405 performs processing in step S2206.

On the other hand, if it is determined that the HTML of the unprocessed line acquired in the above-mentioned step S2204 is not the input tag including the submit attribute, the expense management application 405 skips the processing in step S2206. Then, the operation proceeds to step S2207.

In step S2206, the expense management application 405 adds the HTML of the matter setting input field in front of the input tag including the submit attribute acquired in the above-mentioned step S2204 and writes the addition result in a buffer. The HTML of the matter setting input field written in this case includes the tags 1911 to 1915 of the HTML 1910 illustrated in FIG. 19. Further, the expense management application 405 writes respective optional tags 1914 to 1915 (i.e., choices displayed in the select tag 1912 field) in association with the matter information acquired in step S1409. Further, the buffer can be provided in the RAM 202 or the HDD 205 of the MFP 110. After the processing in step S2206 has been completed by the expense management application 405, the operation proceeds to step S2207.

In step S2207, the expense management application 405 writes the HTML of the line acquired in the above-mentioned step S2204 in the buffer.

Next, in step S2208, the expense management application 405 designates the above-mentioned HTML written in the buffer as HTML of the next screen and terminates the matter setting screen merging processing.

Next, the processing to be performed in step S2209 when the data stored in the merging display 543 field of the matter setting screen information 540 corresponding to the URL of the next page is "N" (indicating the decision not to perform the merging display), will be described in detail below.

After the operation has proceeded to step S2209, the expense management application 405 performs matter information setting processing in step S2210 and then terminates the matter setting screen merging processing. The matter information setting processing to be performed in step S2210 is similar to the processing performed in step S1223 illustrated in FIG. 12 (i.e., the processing described in detail with reference to FIG. 14) and therefore redundant description thereof will be avoided.

<Web Application Execution Processing>

Next, a processing procedure to be performed instead of the processing illustrated in FIG. 18 will be described in detail below with reference to FIG. 23.

FIG. 23 is a sequence diagram illustrating web application execution processing according to the third exemplary embodiment, in which the step numbers used in FIG. 18 are allocated to the same steps, respectively.

In the third exemplary embodiment, in step S1802, if it is determined that the matter setting screen information 540 corresponding to the URL requested in step S1502 is present as a search result in the above-mentioned step S1801, the expense management application 405 performs matter setting screen merging processing in step S2301. In the matter setting screen merging processing, the expense management application 405 performs processing for merging the HTML of the matter setting input field with the HTML of the web application login screen received by the expense management application 405 from the web server 120 in step S1802. The matter setting screen merging processing to be performed in step S2301 is similar to the processing described in detail with reference to FIG. 22 and therefore redundant description thereof will be avoided. Then, if the processing in step S2301 has been completed, the expense management application 405 performs processing in step S1507.

Further, in the third exemplary embodiment, after the processing in step S1510 has been completed, the expense management application 405 performs optional processing in step S2302.

In the optional processing to be performed in step S2302, the expense management application 405 determines whether there is a matter ID included in the form data input by a user via the web application processing screen received from the web browser 403 in step S1510. Then, if it is determined that the matter ID is included in the form data, the expense management application 405 performs processing in step S2303.

On the other hand, if it is determined that there is not any matter ID included in the form data, the expense management application 405 skips the processing in step S2303. Then, the operation proceeds to step S1511.

In step S2303, the expense management application 405 stores the matter ID received in the above-mentioned step S1510 while designating "matter information" in the category 532 field of the expense management log 530. In this case, the expense management application 405 stores a corresponding matter ID "M0001" in the details 534 field. Then, if the processing in step S2303 has been completed by the expense management application 405, the operation proceeds to step S1511.

As mentioned above, according to the third exemplary embodiment, the expense management application 405 adds the matter setting input field to the HTML received from the web server 120 and then transmits the addition result to the web browser 403. Therefore, it is feasible for each user to perform matter setting on a web application screen. As a result, the complicatedness can be reduced in the matter setting input operation.

In the above-mentioned first to third exemplary embodiments, the expense information management system registers the total number of pages used in a job as expense information about the job. However, registering the amount of money required for each job as expense information may be desired in other cases. Therefore, in a fourth exemplary embodiment, an example of processing for registering the amount of money as expense information will be described. Unless otherwise mentioned, if the reference number is the same, a block, a sequence, or processing according to the present exemplary embodiment is the same as the corresponding block, the sequence, or the processing described in the first to third exemplary embodiments.

<Expense Information Registration Processing>

Hereinbelow, a procedure for registering the amount of money as expense information in sequential processing performed by the MFP 110 to register expense information to the matter management server 130, after the web application processing illustrated in FIG. 15 has been terminated, will be described in detail below with reference to FIG. 16.

In step S1612, the expense management application 405 acquires detailed information about a job with reference to the expense management log 530 acquired in step S1605 and the parameter log 700 acquired in step S1602. In this case, the acquisition of matter ID and job name is similar to that described in the first exemplary embodiment. Hereinbelow, the acquisition of expense required for each job will be described in detail below. In the present exemplary embodiment, it is assumed that the parameter log acquired in step S1602 includes the tags 701 to 712 of the parameter log 700 illustrated in FIG. 7. In this case, with reference to the parameter log, the expense management application 405 acquires numerical values "0" from the isoA3 tag 705 and the isoA4 tag 706, which are the subordinate elements of the colorPageCount tag 704. Accordingly, the information indicating that the number of color A3 pages is 0 and the number of color A4 pages is 0 can be acquired. Further, the expense management application 405 acquires numerical values "0" and "100" from the isoA3 tag 708 and the isoA4 tag 709, which are subordinate elements of the monoPageCount tag 707. Accordingly, the information indicating that the number of monochrome A3 page is 0 and the number of monochrome A4 pages is 100 can be acquired. Further, the expense management application 405 acquires the unit prices of respective color and monochrome pages from the billing information 550. Then, the expense management application 405 calculates the amount of money required for a job as expense information based on the acquired number of pages used in the print job and the acquired unit prices. In the present exemplary embodiment, the unit price of each monochrome A4 page is 10 yen. Therefore, the expense management application 405 multiplies 100 pages by 10 yen and acquires 1000 yen as expense for the print job. Then, the expense management application 405 transmits the acquired matter ID, the job information, and the calculated job expense, as expense information, to the matter management server 130 via the HTTP communication unit 423. The rest of the configuration is similar to that described in the first to third exemplary embodiments and therefore redundant description thereof will be avoided. According to the above-mentioned configuration, the expense information can be registered to the matter management server 130 as illustrated, for example, in the third line or the fourth line of FIG. 6.

As mentioned above, according to the fourth exemplary embodiment, the expense management application 405 calculates the amount of money required for each job with reference to the job information and billing information acquired from the parameter log of the service provider 406 and registers the acquired data as expense information to the matter management server 130. Therefore, the amount of money required for each job can be registered as expense information.

In the above-mentioned first to third exemplary embodiments, the expense information management system registers the total number of pages used in a job as expense information about the job. However, registering the using time of a web application as expense information may be desired in other cases. Therefore, in the present exemplary embodiment, an example of processing for registering the using time of a web application as expense information will be described. Unless otherwise mentioned, if the reference number is the same, a block, a sequence, or processing according to the present exemplary embodiment is the same as the corresponding block, the sequence, or the processing described in the first to third exemplary embodiments.

<Expense Information Registration Processing>

The procedure for registering the expense information to the matter management server 130 as part of sequential processing performed by the MFP 110, after the web application processing illustrated in FIG. 15 has been terminated, is not limited to the above-mentioned method relying of the information relating to the amount of money.

Hereinbelow, a procedure for registering the using time of a web application as expense information in sequential processing performed by the MFP 110 to register expense information to the matter management server 130, after the web application processing illustrated in FIG. 15 has been terminated, will be described in detail below with reference to FIG. 16.

In step S1612, the expense management application 405 acquires expense information registration target matter ID (e.g., "M001") and web application ID (e.g., "WS0001") with reference to the expense management log 530 acquired in step S1605. Further, the expense management application 405 searches for the web application information 520 with reference to the acquired web application ID and acquires the web application name (e.g., "precedent information service"). Further, the expense management application 405 acquires web application using time. Hereinbelow, the acquisition of the web application using time will be described in detail below. The expense management application 405 acquires the latest data, in which the device user ID 533 is the device user ID used when the job execution is instructed to the service provider 406 in step S1513 illustrated in FIG. 15 and the data of the category 532 field is "login", from the expense management log 530 and acquires login time from the details 534 field. Further, the expense management application 405 acquires the latest data, in which the device user ID 533 is the above-mentioned device user ID and the data of the category 532 field is "logout", from the expense management log 530 and acquires logout time from the details 534 field. Then, the expense management application 405 acquires a web application using time by calculating a difference time between the login time and the logout time having been acquired as mentioned above. In the present exemplary embodiment, according to the expense management log 530 illustrated in FIG. 5B, the login time is "2014/10/23 16:53:0023" and the logout time is "2014/10/23 17:08:0012". Therefore, the expense management application 405 subtracts the login time from the logout time and acquires a difference time "0:14:49" as the web application using time. Then, the expense management application 405 transmits the acquired matter ID, the web application name, and the calculated difference time (i.e., the web application using time), as the expense information, to the matter management server 130 via the HTTP communication unit 423. The rest of the configuration is similar to that described in the first to third exemplary embodiments and therefore redundant description thereof will be avoided. Through the above-mentioned configuration, the expense information can be registered to the matter management server 130 as illustrated, for example, in the fifth line of FIG. 6.

However, there will be a case that the logout time is not found in the expense management log 530, for example, when a user does not explicitly log out of the web browser 403. In such a case, the expense management application 405 acquires the time of a job lastly executed by the corresponding user from the parameter log acquired in step S1602 and uses the acquired time as the logout time instead.

As mentioned above, according to the fifth exemplary embodiment, the expense management application 405 acquires the login time and the logout time from the expense management log 530 and calculates a difference time. Then, the expense management application 405 acquires the calculated difference time as the web application using time and registers the acquired data, as expense information, to the matter management server 130. Therefore, the web application using time can be registered as expense information.

In the above-mentioned exemplary embodiments, although the example configuration that the expense management application 405 registers the expense information to the matter management server 130 at the time of logging out of the web server 120 has been described, the registration of the expense information can be performed at another timing. For example, the expense management application 405 can be configured to detect the completion of a job by the service provider 406 and register expense information to the matter management server 130 in response to the detection of the above-mentioned job execution completion. The expense management application 405 can detect the job completion by the service provider 406 by receiving the job input result returned from the service provider 406 in step S1516 illustrated in FIG. 15 or by monitoring the parameter log 700 of the service provider 406.

Even in a case where the above-mentioned job expense information is registered to the matter management server 130 in response to the completion of each job and the expense information to be registered is the time (expressed by using the unit time "minute"), the expense management application 405 can detect the job start time in the following manner. For example, the expense management application 405 designates the job input timing to the service provider in step S1513 illustrated in FIG. 15 as "job start date and time". Further, in a case where the parameter log 700 includes a record of job start date and time, the expense management application 405 can acquire the job start date and time from the parameter log 700. The expense management application 405 can detect the job execution completion by receiving the job input result (see step S1516 in FIG. 15). Further, the expense management application 405 can monitor the parameter log 700 of the service provider 406 and detect the job execution completion at the recording time of the above-mentioned job information in the parameter log 700. Further, in a case where the parameter log 700 includes a record of job termination date and time, the expense management application 405 can acquire the job termination date and time from the parameter log 700.

Further, in the above-mentioned first to third exemplary embodiments, the expense information to be registered to the matter management server 130 is the amount of job processing (e.g., expressed by using the unit "page"). In the above-mentioned fourth exemplary embodiment, the expense information to be registered to the matter management server 130 is the amount of money (e.g., expressed by using the unit "yen"). In the above-mentioned fifth exemplary embodiment, the expense information to be registered to the matter management server 130 is the time (e.g., expressed by using the unit "minute"). However, it is feasible to combine some or all of the above-mentioned plurality of pieces of expense information and register a combined result to the matter management server 130.

As described above, the expense management application 405 of the MFP 110 according to the present exemplary embodiment mediates the communications between the web browser 403 and the web server 120 and between the web server 120 and the service provider 406. Further, the expense management application 405 displays matter setting screens, acquires job information, and registers expense information relating to the above-mentioned sequential processing to the matter management server 130. Therefore, even in a case where the expense information management system performs sequential web application processing including the processing by the web server 120 and the job execution by the MFP 110 and registers expense information relating to the sequential processing to the matter management server 130, it is feasible to simply register the expense information relating to the above-mentioned sequential processing, although it was conventionally very troublesome. Further, in the present exemplary embodiment, the above-mentioned expense information registration can be simply performed without incorporating any new mechanism into the web server 120 or the matter management server 130. Further, the MFP 110 according to the present exemplary embodiment can perform the above-mentioned expense information registration without changing the existing web browser 403 and the service provider 406. Therefore, the effects of the present exemplary embodiment can be obtained even in a case where the MFP is a legacy device. For example, the expense management application 405 monitors the parameter log 700 of the service provider 406 and acquires information about a completed job. According to the above-mentioned configuration, the expense management application 405 searches for the parameter log 700 with reference to the device user ID used when the job execution has been instructed in steps S1601 and S1602 illustrated in FIG. 16. If a corresponding log is present, the expense management application 405 acquires job result information, as expense information, from the above-mentioned log. However, the expense management application 405 can perform the above-mentioned search with reference to user ID and domain name in addition to the device user ID. Further, the expense management application 405 can be configured to search for the parameter log 700 with reference to job reception number of the completed job. Further, other logs required in the expense information registration can be output by the expense management application 405.

As mentioned above, according to the exemplary embodiments, it becomes feasible to simply register expense information when an image processing apparatus is used in cooperation with an external service to a matter management apparatus, without incorporating any new mechanism into the service or an expense management apparatus and without changing a web browser or a service provider existing in the image processing apparatus.

The configurations and contents of various data are not limited to the above-mentioned examples and can be modified in various ways according to application or purpose thereof.

Although the present invention has been described with reference to some exemplary embodiments, the present invention can be realized, for example, as a system, an apparatus, a method, a program or a storage medium. More specifically, the present invention can be applied to a system constituted by a plurality of devices or an apparatus constituted by a single device.

Further, the present invention encompasses every possible combination of the above-mentioned respective exemplary embodiments.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082561, filed Apr. 14, 2015, which is hereby incorporated by reference herein in its entirety.

What is claimed is:

1. An image processing apparatus having a service provider for outputting a first log representing information about a job executed according to a request of a service for providing a function in cooperation with the image processing apparatus, comprising:
   a memory storing instructions as an expense management application; and
   a processor which is capable of executing the instructions causing the image processing apparatus to:
      request an expense management apparatus to perform user authentication processing in a case where a user accesses the service;
      request the service provider to perform a job in response to a reception of a request from a web application via a network;
      acquire matter information of the user authenticated by the expense management apparatus;
      monitor the first log output by the service provider and acquire job information about a job of the user executed by the service provider according to the request from the web application, from the first log; and
      register expense information based on the acquired job information, as expense information of the acquired matter information, to the expense management apparatus.

2. The image processing apparatus according to claim 1, wherein the instructions cause the image processing apparatus to select a piece of the acquired matter information, and
   wherein the expense information is registered as expense information about the selected matter information.

3. The image processing apparatus according to claim 2, wherein the instructions cause the image processing apparatus to:
   mediate communications with the service for detecting an access to the service;
   request the expense management apparatus to perform user authentication in a case where an access to the service has been detected; and
   display a screen for selecting the piece of the matter information when an access for an acquisition request of a predetermined screen from the image processing apparatus to the service is detected.

4. The image processing apparatus according to claim 3, wherein the instructions cause the image processing apparatus to register the expense information in a case where an instruction to terminate the access to the service is detected.

5. The image processing apparatus according to claim 3, wherein the instructions cause the image processing apparatus to:
   output information relating to time during which the service is used as a second log; and
   acquire information relating to time during which the service is used from the second log.

6. The image processing apparatus according to claim 1, wherein the expense information is registered if completion of a job execution by the image processing apparatus is detected through monitoring of the first log.

7. The image processing apparatus according to claim 1, wherein the acquired job information includes information relating to the number of pages processed for the above-mentioned job.

8. A control method for an image processing apparatus having a service provider for outputting a first log representing information about a job executed according to a request of a service for providing a function in cooperation with the image processing apparatus, the control method comprising:
   requesting an expense management apparatus to perform user authentication processing in a case where a user accesses the service;
   requesting the service provider to perform a job in response to a reception of a request from a web application via a network;
   acquiring matter information of the user authenticated by the expense management apparatus;
   monitoring the first log output by the service provider and acquiring job information about a job of the user executed by the service provider according to the request from the web application from the first log; and
   registering expense information based on the acquired job information, as expense information of the acquired matter information, to the expense management apparatus.

* * * * *